United States Patent
Coffey et al.

(10) Patent No.: US 10,779,061 B2
(45) Date of Patent: Sep. 15, 2020

(54) SYSTEMS AND METHODS FOR MANAGED CONNECTIVITY USING LOCAL AREA WIRELESS NETWORKS

(71) Applicant: CommScope Technologies LLC, Hickory, NC (US)

(72) Inventors: Joseph C. Coffey, Burnsville, MN (US); Joseph Polland, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/311,138

(22) PCT Filed: Jul. 6, 2017

(86) PCT No.: PCT/US2017/040816
§ 371 (c)(1),
(2) Date: Dec. 18, 2018

(87) PCT Pub. No.: WO2018/009601
PCT Pub. Date: Jan. 11, 2018

(65) Prior Publication Data
US 2019/0342635 A1    Nov. 7, 2019

Related U.S. Application Data

(60) Provisional application No. 62/359,148, filed on Jul. 6, 2016.

(51) Int. Cl.
*G08B 21/00*    (2006.01)
*H04Q 1/02*    (2006.01)
(Continued)

(52) U.S. Cl.
CPC .............. *H04Q 1/136* (2013.01); *H04Q 1/03* (2013.01); *H04W 4/80* (2018.02); *H04W 92/02* (2013.01)

(58) Field of Classification Search
CPC ........... H04Q 1/136; H04Q 1/03; H04W 4/80; H04W 92/02
(Continued)

(56) References Cited

U.S. PATENT DOCUMENTS

| | | | |
|---|---|---|---|
| 2010/0210134 A1* | 8/2010 | Caveney | H04Q 1/149 439/490 |
| 2013/0064249 A1* | 3/2013 | Shar | H04O 1/136 370/400 |

(Continued)

OTHER PUBLICATIONS

International Searching Authority; "Notification of Transmittal of the International Search Report and the Written Opinion of the International Searching Authority, or the Declaration, from PCT Application No. PCT/US2017/040816, dated Oct. 12, 2017"; from Foreign Counterpart of U.S. Appl. No. 62/359,148; pp. 1-15; dated Oct. 12, 2017; Published: KR.

(Continued)

*Primary Examiner* — Mark S Rushing
(74) *Attorney, Agent, or Firm* — Fogg & Powers LLC

(57) ABSTRACT

Systems and methods for managed connectivity using local area wireless networks are provided. In certain embodiments, patching equipment in the system includes a plurality of ports configured to receive a plurality of connectors; a processing unit configured to execute instructions thereon; and a wireless communication interface, wherein the processing unit communicates connectivity information with a collection device through the wireless communication interface.

20 Claims, 32 Drawing Sheets

(51) Int. Cl.
*H04W 4/80* (2018.01)
*H04W 92/02* (2009.01)

(58) Field of Classification Search
USPC ......................................... 340/687
See application file for complete search history.

(56) References Cited

U.S. PATENT DOCUMENTS

| | | | |
|---|---|---|---|
| 2013/0329344 A1* | 12/2013 | Tucker | H02B 15/00 |
| | | | 361/633 |
| 2015/0052272 A1 | 2/2015 | Malone et al. | |
| 2015/0078742 A1 | 3/2015 | Wu et al. | |
| 2015/0143153 A1 | 5/2015 | German et al. | |
| 2015/0334473 A1 | 11/2015 | Pinn et al. | |
| 2015/0350013 A1 | 12/2015 | Caveney et al. | |
| 2016/0234301 A1* | 8/2016 | Qi | H04W 4/80 |
| 2016/0286339 A1* | 9/2016 | Weizman | H04W 4/06 |
| 2016/0302060 A1* | 10/2016 | Agardh | H04L 67/16 |

OTHER PUBLICATIONS

European Patent Office, "Extended European Search Report from EP Application No. 17824850.6", from Foreign Counterpart to U.S. Appl. No. 16/311,138, dated Jan. 27, 2020, pp. 16, Published: EP.

\* cited by examiner

SYSTEMS AND METHODS FOR MANAGED CONNECTIVITY USING LOCAL AREA WIRELESS NETWORKS

CROSS REFERENCE TO RELATED APPLICATIONS

This application is a National State 371 Application of International Patent Application No. PCT/US2017/040816 titled "SYSTEMS AND METHODS FOR MANAGED CONNECTIVITY USING LOCAL AREA WIRELESS NETWORKS" filed on Jul. 6, 2017, which claims the benefit of, and priority to, U.S. Provisional Patent Application Ser. No. 62/359,148, filed on Jul. 6, 2016, both of which are hereby incorporated herein by reference, in their entirety.

BACKGROUND

Managed connectivity is an important technology for data centers where optical fiber and wire connectivity is used to interconnect high bandwidth ports between network elements such as servers, switches, and routers to other network elements. As data centers have grown larger and become more security conscious and more geographically diverse, the need for connectivity identification, near real time detection and self-documentation, are becoming compulsory requirements.

In certain systems, managed connectivity systems may implement a panel that is equipped with electronics that provide connection information to an upstream controller such as a middleware or database system. This information may be used to create a map of a network. These systems generally use three basic types of managed connectivity technology. These types include continuity, inference, and absolute types of managed connectivity technological systems.

In a continuity system, the system uses panels that are equipped with internal or external contacts that make electrical connections with dedicated contacts in the cables that connect to the panels. When both ends of the cable are inserted into their respective panels a continuity measurement allows the system to see the connection at both ends. This method may require a continuity wire and special connectors in both copper and fiber cables as well as a tiered structure of scanners.

In an inference detection system, the system can detect the insertion of a patch cord and transmit the information to an upstream controller via a local panel manager. The connection mapping has to be manually initiated. Since there is no connection between the panel controller and the cable, there is no cable identification or characteristic data available. This can allow a cable with the wrong transmission characteristics to be inserted into a port. In addition, these systems are constrained to patching zones. This confines the patching or cross connecting to a specific zone. Patching across zones cannot be detected by the inference systems.

In an absolute system, the system may use dedicated electrical contacts embedded in each panel port to mate with contacts on a plug. These contacts are not part of the signaling path and are dedicated for use in managed connectivity. The contacts provide an electrical connection between the inserted plug and the panel to enable the panel controller to detect the insertion (or removal) of a plug into a panel port and read the memory device (CPID) housed inside the plug. Part of the data content is a unique identification code so the system knows what cord is inserted in which panel port.

Panels equipped with managed connectivity controllers are expensive and are difficult to manufacture due to circuit, connector, and contact designs. Panel footprints are larger which means there is less rack space and more IP communication ports are required. Further, panels must be equipped with internal power supplies or converters. Further, the power dissipation limits for these panels may depend on the use of PoE or external converters.

SUMMARY

Systems and methods for managed connectivity using local area wireless networks are provided. In certain embodiments, patching equipment in the system includes a plurality of ports configured to receive a plurality of connectors; a processing unit configured to execute instructions thereon; and a wireless communication interface, wherein the processing unit communicates connectivity information with a collection device through the wireless communication interface.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the exemplary embodiments described herein, systems and methods for managed connectivity using personal local area networks are provided. For example, low energy wireless technology and other wireless communication technologies used for personal local area networks may be implemented in managed connectivity systems. In certain implementations, the low energy wireless technology provides both small size and lower power consumption. Due to the small size and lower power consumption, the systems and methods that are used to access identification data used to manage the connections in a system can be moved from a panel into plugs that are connected into ports in the panel.

In certain embodiments, by moving systems and methods from the panel into the connector plugs, the management intelligence may be virtualized at a management device or connection management system as the panels and/or plugs more approximate the functionality of sensors as they report events to the connection management system. Further, the movement of systems into the connector plugs also allows the simplification of panel design as the need for extra IP ports and complex networking stacks are removed. Accordingly, the removal of the extra IP ports and complex networking stacks reduces the cost of panels in a managed connectivity system.

Figure 1:
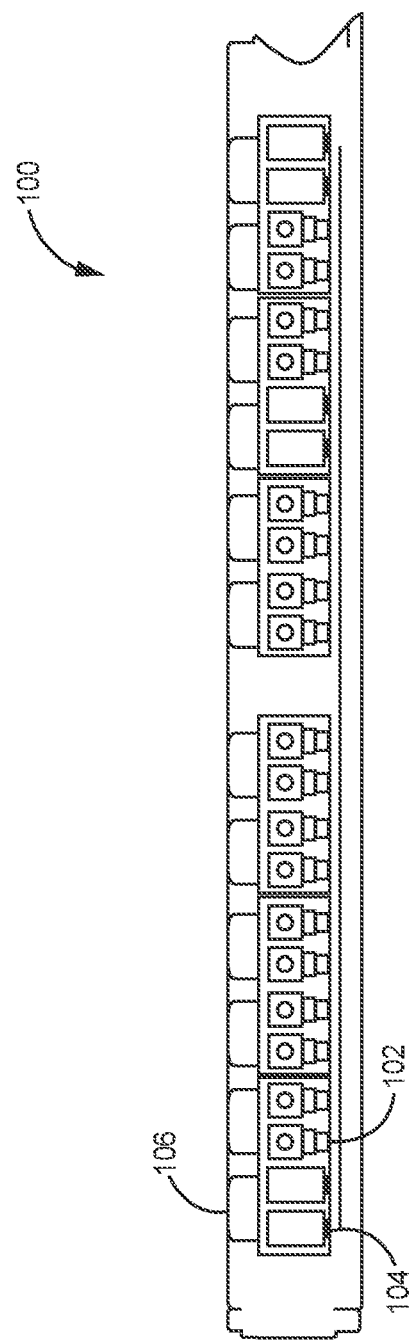
FIG. 1 is a diagram illustrating an exemplary embodiment of a panel having multiple ports and connector plugs.

FIG. 1 illustrates one exemplary embodiment of a portion of a panel 100 that is capable of providing connectivity using low energy wireless technology. As illustrated the panel 100 includes multiple ports 102 into which connector plugs 104 may be inserted. The panel 100, as described herein, generally refers to a panel in which a plurality of ports 102 are formed or otherwise housed. In certain implementations, the panel may be a patch panel or other type of panel that houses ports. Each port includes at least one adapter (or other attachment mechanism). In certain implementations, when the panel is a patch panel, each port 102 may include a "front" and a "rear". A port 102 may be configured to communicatively couple cables that are attached to the front of a particular port to one or more cables that may be attached to the rear of the particular port. Other patching systems may be similarly implemented. In contrast to panels that lack the ability to communicate through low energy personal area networks, the panel 100 may have a simplified design, such that the panel 100 includes a simple processor with a PAN interface, flash memory for each port, along with LEDs with each port.

In particular implementations, the ports may couple to connector plugs 104 that terminate cables used as a physical medium for the transmission of information. For example, the connector plugs 104 may couple to optical fibers, coaxial cable, CAT-5, CAT6A, CAT7, CAT8, or other cable that is able to function as a physical medium for the transmission of data. In embodiments described herein, the connector plugs 104 may be equipped with low energy wireless transmitters.

In exemplary implementations, the connector plugs 104 may receive electrical power from the panel when the connector plugs 104 are inserted into ports 102 in the panel 100. Initially, a disconnected connector plug 104 may be unable to operate for lack of power. When the connector plug 104 is inserted into a port 102, the panel 100 provides power to the connector plug 104. As the connector plug 104 receives power, a personal area or wireless communication interface becomes active. When the personal area network interface on the connector plug 104 becomes active, the personal area network may act as a personal area network end point. The personal area network interface on the connector plug 104 may then communicate with a collection device for the personal area network. The collection device may be a device that is able to communicate over the personal area network that collects connectivity information from components in the personal area network. The collection device may be a mobile device, such as a laptop, mobile phone, tablet or other mobile device or the collection device may be a desktop or other non-mobile device. In at least one implementation, the collection device communicates the collected connectivity information to a connection management system over an IP network. Alternatively, the collection device may manage the connectivity of the personal area network or perform management tasks for the connectivity of the personal area network in cooperation with a connection management system. In a further alternative implementation, the collection device and the connection management system may be the same device.

In at least one exemplary embodiment, the panel 100 may include port LEDs 106. In certain implementations, the port LEDs 106 may be multi-color LEDs. The port LEDs 106 may light up to indicate the status of a connection at a particular port or other useful indication defined by the connection management system, such as errors, locate port, locate panel, and the like. Further, each port may have a port flash memory that can be read by an inserted connector plug 104. The panel 100 may also provide power to the connector plugs 104 that are inserted into the ports 102. Accordingly, the panel 100 provides power to the connector plugs 104 that reads the port flash memory.

Also, in certain exemplary implementations, the panel 100 may include a processor with a PAN interface. When the panel 100 includes a simple processor with a PAN interface, the processor may control whether the port LEDs 106 are turned on or off, the illuminated color, the flash cadence, and the like as directed by the connection management system or collection device. Further, the panel processors may also contain flash memory that stores information about the panel 100.

Figure 2:
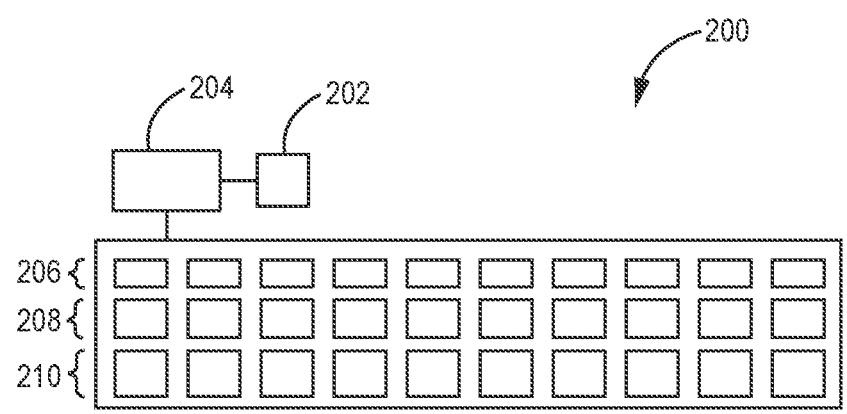
FIG. 2 is a block diagram illustrating an exemplary embodiment of a panel.

FIG. 2 is a block diagram that illustrates the components of a panel 200 in at least one implementation. As illustrated the panel 200 includes a panel processor 204, a panel memory 202, multiple port LEDs 206, multiple port memories 208, and multiple ports 210. As described with regards to FIG. 1, the panel processor 204 may be a basic processor. Alternatively, the panel processor 204 may be a specialized processor or other type of processing unit. In at least one implementation, the processor 204 may include a PAN or wireless communication interface. The processor 204 may communicate with a collection device through the wireless communication interface. In response to commands from the collection device, the panel processor 204 may turn on and off, select an illuminated color, select a flash cadence, and the like of the port LEDs 206.

In at least one implementation, the panel processor 204 may be associated with panel memory 202. In at least one implementation, the panel memory may be a flash memory (such as an EEPROM), however other types of memory may be used. The panel memory 202 may store information describing the panel 200. For example, the panel memory 202 may store a panel identifier, type of panel/model number, serial number, number of ports, vendor, manufacture date, manufacture plant, possible location, among other information that may be helpful in monitoring the panel 200. In at least one implementation, the information in the panel memory 202 may be read upon start-up of the panel and broadcast to the collection device over a wireless network. Further, the information in the panel memory 202 may be broadcast periodically by the panel processor 204 through the wireless communication interface. Alternatively, the information in the panel memory 202 may be transmitted by the panel processor 204 through the wireless communication interface to a specific address of the collection device upon reception of a request through the collection device.

In certain embodiments, each port 210 has an associated port memory 208 and port LED 206. For example, each port may have a small I2C or UNIO flash memory that is positioned so as to be readable by a cable connector plug that is connected to the port. When the connector plug is inserted into a port 210, the port 210 provides power to the connector plug such that the connector plug is able to read and transmit the data that is stored in the port memory 208. The information stored in the port memory 208 may include a panel identifier, a port ID, a port type, a port insertion count, along with other information that may be useful for monitoring the functionality and managing the connectivity of the panel 200.

Figure 3:
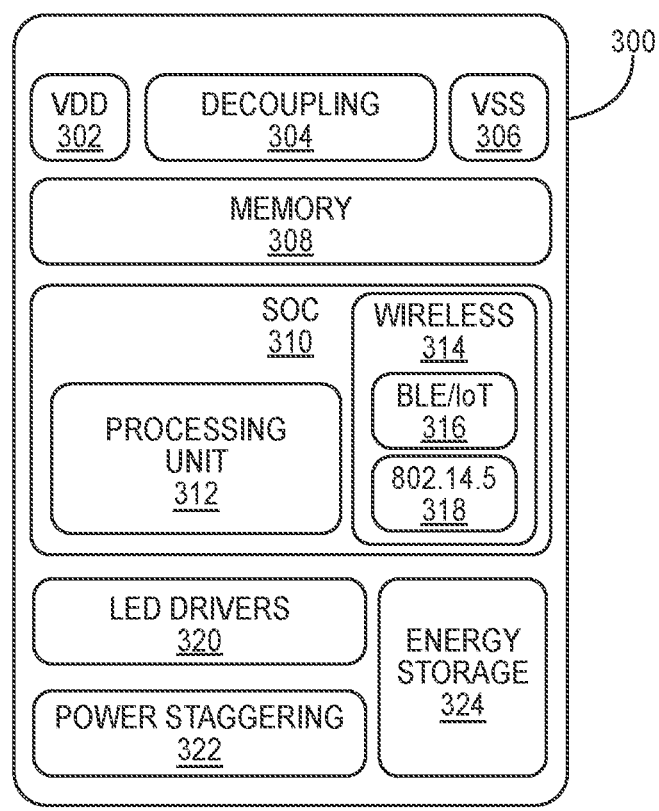
FIG. 3 is a block diagram illustrating an exemplary embodiment of a panel microcontroller.

FIG. 3 is a block diagram illustrating a control stack for a panel microcontroller 300. In certain implementations, the panel microcontroller 300 is a more detailed view of the panel processor 204 and panel memory 202 described above in FIG. 2. The panel microcontroller 300 includes a VDD 302, decoupling 304, and VSS 306, which components function together to connect the panel microcontroller 300 to a power supply as understood by those having skill in the art. The panel microcontroller 300 uses the provided power to drive the several components in the panel microcontroller 300.

The panel microcontroller 300 further includes a memory 308 that functions as described above with respect to the panel memory 202 in FIG. 2. In at least one implementation, the memory 308 may be an I2C or a single wire EEPROM. Further, the panel microcontroller 300 may include a system on chip (SOC) 310. The SOC 310 includes a processing unit 312 and a wireless communication interface 314. The processing unit 312 functions in a similar manner to the panel processor 204 in FIG. 2 (and may function as panel processor 204) and the wireless communication interface 314 functions in a similar manner to the wireless communication interface described as being associate with the panel processor 204. As described above, the processing unit 312 communicates with a collection device through the wireless communication interface 314. In certain implementations, the wireless communication interface 314 is capable of communicating through a variety of wireless standards such as a BLE/IoT wireless interface 316 or an 802.15.4 interface 318. Also, the wireless communication interface may communicate through other wireless communication interface suitable for implementation in personal area networks. The wireless communication interface 314 may also communicate according to other wireless standards known to one having skill in the art. The processing unit 312 may be a microprocessor or other device capable of providing the desired processing.

In certain embodiments, as part of these communications received through the wireless communication interface 314 from the PAN master/coordinator, the processing unit 312 processes commands received from the PAN master/coordinator that instruct the processing unit 312 how to control the port LEDs through LED drivers 320. The LED drivers 320 use the power received by the panel microcontroller 300 to drive the port LEDs. Further, in certain implementations, the panel microcontroller 300 may not have a physical electrical connection to the ports. Accordingly, when a connector plug is inserted into a port in the panel, the connector may transmit a message to the collection device indicating that a particular port has a connection. The panel microcontroller 300 may then receive a message from the collection device dictating how the panel microcontroller 300 should drive the LED associated with the connected port to correctly represent the connected status of the associated connected port.

In at least one implementation, the panel microcontroller 300 may include a power staggering controller 322 and energy storage 324. In certain embodiments, the monitoring of the insertion or removal of connector plugs from a panel port is reliant on the power that is provided to the panel. In the event that the panel loses power, the connector plugs that are inserted into the ports determine that they have experienced a removal event, where a removal event is the determination that a connecter plug has been removed from their associated port due to the loss of power provided to the connector plugs through the panel. When the connector plugs determine that a removal event has occurred, the connector plugs may transmit a removal message to the collection device. Conversely, when the panel power is restored, the restoration of power to the panel and through the panel to the connector plugs inserted into the ports may cause the connector plugs to determine that an insertion has occurred. Upon detecting the restoration of power as an insertion event, the connector plugs may transmit an insertion message to the collection device.

Power events, such as the loss of power to the panel and a subsequent restoration of power to the panel, may result in the transmission of false insertion and removal messages. In a high density system having multiple panels, a power event may result in the transmission of large numbers of spurious insertion and removal events due to the simultaneous loss and restoration of power at the different panels in the system. As such, a large number of connectors may simultaneously transmit removal or insertion messages, which may lead to congestion in the wireless network and inaccurate connection status in the management system. In certain implementations, to prevent congestion from occurring, the panel may be equipped with an energy storage unit 324 such as a super capacitor or battery to keep the panel powered up for a limited period of time. For example, the panel microcontroller 300 may include energy storage 324. During the period of time in which the energy storage 324 discharges, the panel microcontroller 300 may include power staggering controller 322 to stagger the connectors that experience power events so that a power event that occurs is not experienced simultaneously by the multiple connector plugs that receive power from the panel.

Figure 4:
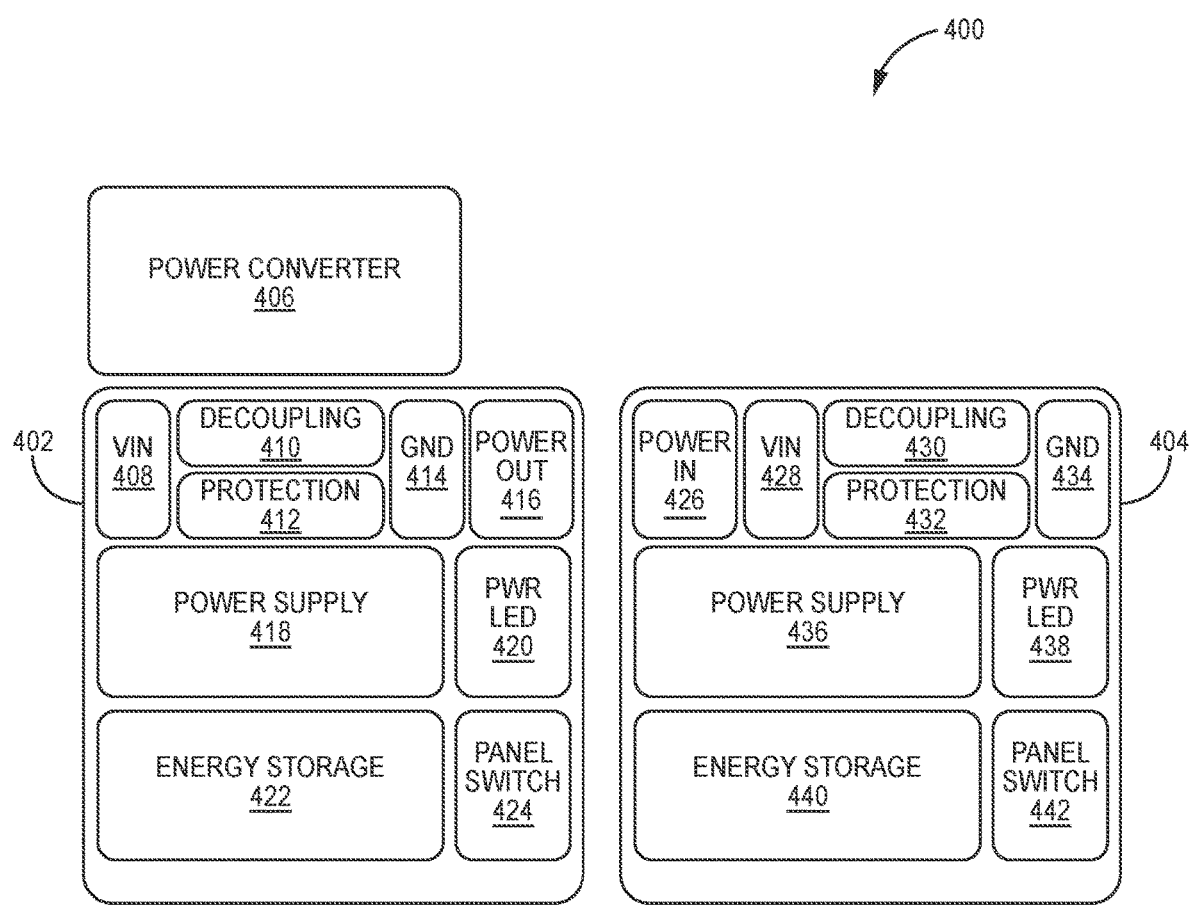
FIG. 4 is a block diagram illustrating exemplary embodiments of a master panel power stack and a general panel power stack.

FIG. 4 is a block diagram illustrating a power system 400 for supplying power to multiple panels (and the associated ports) according to at least one embodiment. For example, power system 400 shows two panel power stacks, a master panel power stack 402 and general panel power stack 404. The master panel power stack 402 is configured to receive power from a power converter 406 and provide the power as needed to a master panel. In certain implementations, the power converter 406 may be a low cost wall mount converter. As shown, a single converter may provide power for many panels within a rack through multiple panel power stacks. In particular, a power converter 406 provides power to the master panel power stack 402, where the master panel power stack 402 is configured to provide power to the other panels through the general panel power stack 404.

In certain implementations, the power converter 406 may be either a 12, 24, or 48 VDC wall converter that receives 120 or 240 VAC. The power converter 406 may also be any other type of converter that receives electrical power of one type and converts the power to a voltage that is usable by both the main panel and other panels. In certain applications using 24 or 48 VDC, a locking connector may be used. Further, the power converter 406 may be a carrier grade DC-DC converter. This DC-DC converter may be used in a single panel within a rack or cabinet.

In at least one embodiment, the master panel power stack 402 receives power from the power converter 406 through the combination of the VIN 408, GND 414, decoupling 410, and protection 412. The VIN 408 receives the voltage from the power converter and provides the power to the power supply 418. The GND 414, decoupling 410, and protection 412 function as known to one having skill in the art. The power supply 418 receives the power from the power converter and transforms it for use for the various components within the main panel. In at least one implementation, the master panel power stack 402 may include an energy storage 422. The energy storage 422 may be a battery, a capacitor, or other device capable of storing energy. The master panel power stack 402 may also include a PWR LED 420 may receive power from the power supply 418 to indicate that the master panel is receiving power. Also, the main panel power stack 401 may also include a panel switch 424. That controls whether power is supplied from the master panel power stack 402 to a panel.

In a further implementation, the master panel power stack 402 may provide power to other electronics through a power out 416. For example, the master panel power stack 402 may provide power through power 416 to a regular panel power stack 404. For example, the regular panel power stack 404 may receive power through the power in 426. The power in 426 may then provide power to VIN 428, decoupling 430, protection 432, and gnd 434, which function in a similar manner to VIN 408, decoupling 410, protection 412, and gnd 414. Further, the power supply 436, PWR LED 438, energy storage 440, and panel switch 442 function in a similar manner to power supply 418, PWR LED 420, energy storage 422, and panel switch 424.

Figure 5:
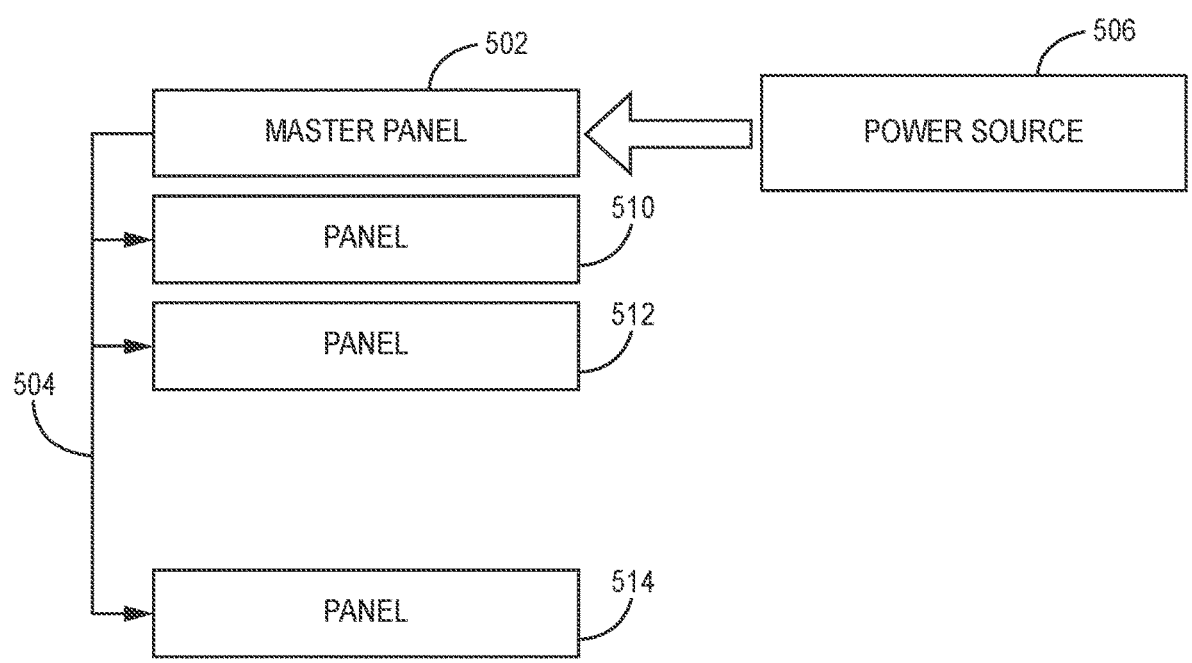
FIG. 5 is a block diagram illustrating an exemplary embodiment of the power distributed through multiple panels.

FIG. 5 is a block diagram of a system 500 illustrating at least one embodiment for providing power to multiple panels. As shown in system 500, a power source 506 provides power to a master panel 502. The master panel 502 may be connected to a bus 504. The bus 504 receives power from the master panel 502 and distributes the power provided through the master panel 502 to one or more panels 510, 512, and 514. In at least one implementation, the bus 504 may be a DC power bus but other electrical systems capable of distributing power to multiple panels may be implemented. For example, in one alternative implementation the individual panels may each have an associated power source. Alternatively, the individual panels may be grouped into sets of panels that share a power source.

Figure 6:
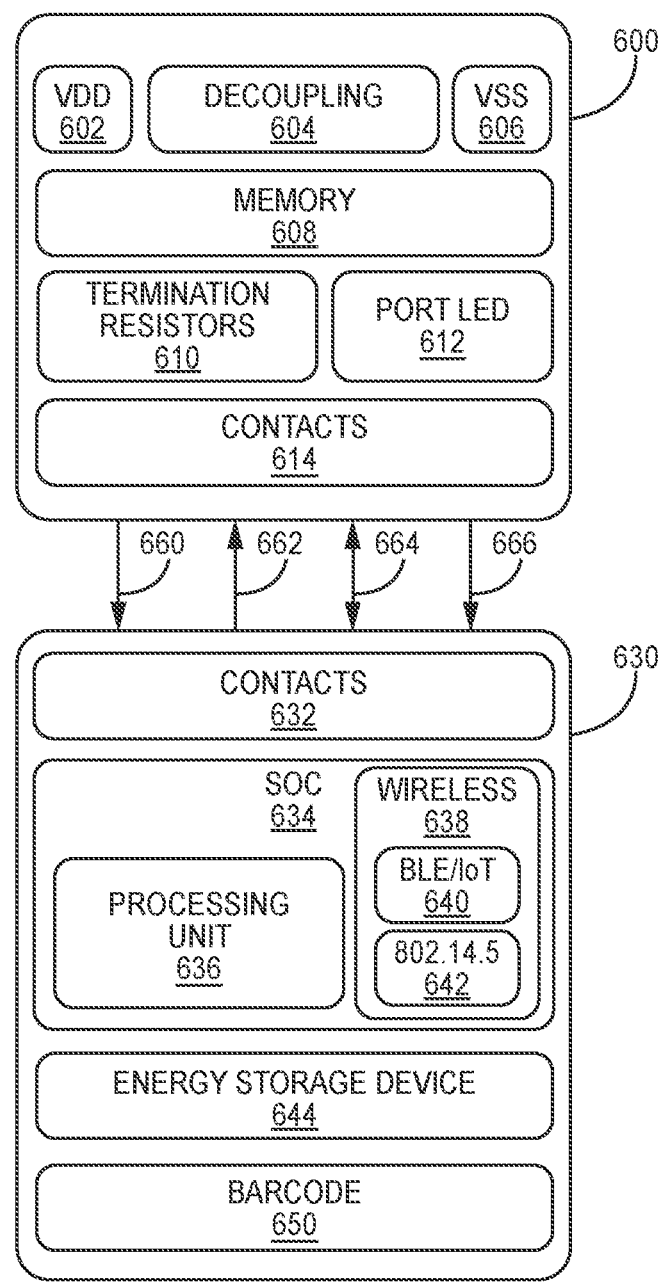
FIG. 6 is a block diagram of an exemplary embodiment of a connector plug connected to a panel port.

FIG. 6 is a block diagram illustrating a panel port 600 and a connector plug 630 coupled to the panel port. As described above, the panel port 600 does not have a physical communication connection to a panel microcontroller for communicating physical layer management information about the panel port 600 to an associated panel microcontroller. However, the panel port 600 does receive electrical power from an associated panel power stack for the panel containing the panel port 600. For example, the VDD 602, decoupling 604, and VSS 606 provide power to the panel port 600. Also, the panel port 600 includes a port LED 612 that is driven by a respective panel microcontroller. For example, upon reception of commands from a collection device, a panel microcontroller may drive the port LED 612 to represent the state of the connection between the panel port 600 and the connector plug 630. Further, the panel port 600 may also include a memory 608 that stores identification information for the panel port 600. The memory 608 may be an I2C or UNIO flash memory or other type of memory. The memory 608 may store memory that stores information such as a panel identifier, a port ID, a port type, a port insertion count, along with other information that could be useful to a user when describing the panel port 600.

In embodiments described herein, the panel port 600 further includes contacts 614 for connecting to a connector plug 630. The contacts 614 may be capable of coupling power and data between the connector plug 630. For example, the connector plug 630 may be coupled to the panel port 600 through the contacts 614 such that clock information 660, data 664, VSS 662, and VDD 666 are communicated between the panel port 600 and the connector plug 630. Further, the panel port 600 may include termination resistors 610 for terminating connections between the panel port 600 and the connector plug 630.

In certain embodiments, the connector plug 630 is able to communicate physical layer information or information that can be used for managing the connectivity of a system through a wireless communication interface 638. The wireless communication link 638 may communicate connectivity information to a collection device, which collection device may be a connection management system or a master device, such as a laptop or a mobile device that in turn transmits the connectivity information to the connection management system. The connector plug 630 includes contacts 632 that couple with the contacts 614 of the panel port 600 to receive data (clock information 660 and data 664) and power (VSS 662 and VDD 666) from the panel port 600.

In exemplary implementations, the connector plug 630 includes a system on chip (SOC) 634. The SOC 634 includes a processing unit 636 and a wireless communication interface 638. The wireless communication interface 638 may include a BLE/IOT communication interface 640, an 802.15.4 communication interface 642, or other wireless communication interface. As illustrated, the wireless communication interface 638 shows the BLE/IOT communication interface 640 and an 802.15.4 communication interface 642. In addition to the illustrated communication interfaces, the wireless communication interface 638 may include communication interfaces for communicating according to other wireless communication standards known to one having skill in the art beyond what is illustrated in FIG. 6. Upon inserting the connector plug 630 into the panel port 600, the connector plug 630 obtains electrical power from the panel. The SOC 634 may then detect the presence of power as an insertion event and begins to read the memory 608 associated with the panel 600. Once the SOC 634 reads the information from the memory 608, the SOC 634 may format a message and send the connectivity information to the collection device, either a connection management system, such as a workstation or a master device via the wireless communication interface 638. When the plug is removed, the SOC 634 detects the loss of power and sends a disconnect message to the management workstation or aggregation device. To provide power for transmission of the disconnect message, the connector plug 630 may include an energy storage device 644 such as a battery or a capacitor. The energy storage device 644 is charged by power received from the panel port 600. The energy storage device 644 may store enough energy to keep the SOC 634 operational for a period after removal from the panel.

In certain implementations, the connector plug 630 may also include a memory device similar to the memory 608 in the panel port. When the cable connector plug 630 is inserted in a panel port 600, the SOC 634 receives power and initializes. During initialization, the SOC 634 may read information from the memory device in the connector plug 630. The information stored in the memory device may include cable identification, cable subID, category, rating, polarity, color, length, insert count, country of manufacture, serial number, catalogue number, date of manufacture, manufacturer identification, plant identification, software version, hardware version, and other information that may be useful for managing the connectivity of the cable. The SOC 634 may then read information in the memory 608 to obtain port information. In certain implementation, the combination of the connector plug information and the panel port information may be immediately broadcast through the wireless communication interface 638 over a network as an insertion event. Alternatively, the information may be transmitted periodically, or transmitted in response to query by a master/coordinator. When the connector plug 630 is removed from the port plug 600, the connector plug 630 may remain active for a period of time, during which period of time, the connector plug 630 may issue a disconnect event, where the disconnect event indicates a port identification, cable identification, and a cable subID associated with the disconnection. Further, the connector plug 630 may include a barcode 650 to facilitate the physical identification of the connector plug.

Figure 7:
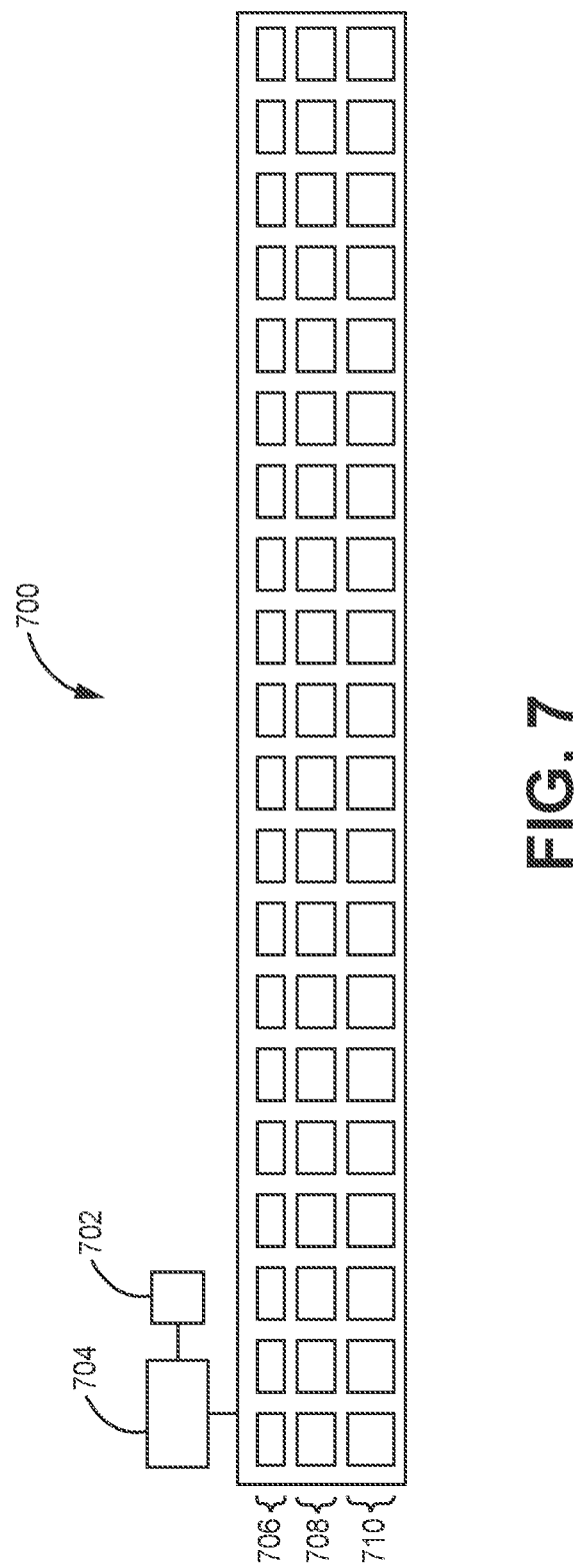
FIG. 7 is a block diagram illustrating an exemplary embodiment of a panel where each port has an associated processing unit.

In certain implementations, panels and ports may be able to connect to connectors or panels having wireless communication interfaces and cables designed to provide managed connectivity through other technologies, such as absolute technologies like QUAREO. FIG. 7 is a block diagram of a panel 700 capable of supporting both the connector plugs having wireless communication interfaces and cables designed to provide managed connectivity using absolute technologies. As illustrated the panel 700 includes a panel processor 704, a panel flash memory 702, multiple port LEDs 706, multiple port processors 708, and multiple ports 710. Where each port in the multiple ports 710 has an associated processor in the multiple port processors 708 and an associated port LED in the multiple port LEDs 706. In a similar manner as described with regards to FIG. 1, the panel processor 704 may be a basic processor. Alternatively, the panel processor 704 may be a specialized processor. Also, the processor 704 may be similar to the processor 204 in FIG. 2. Accordingly, the processor 704 may include a wireless communication interface. The panel processor 704 communicates with a collection device through the wireless communication interface. In response to commands from the collection device, the panel processor 704 may turn on and off port LEDs 706. Alternatively, the processor 704 may communicate with a collection device through an IP or other wired connection.

In at least one implementation, the panel processor 704 may be associated with panel memory 702. In at least one implementation, the panel memory 702 may be a flash memory (such as an EEPROM), however other types of memory may be used. The panel memory 702 may store information describing the panel 700, such as id and inventory information in a similar manner to panel memory 202 in FIG. 2.

In certain embodiments, each port 710 has an associated port processor 708 and port LED 706. For example, the port processors 708 may be simple processors, where each processor includes an interface to read memory located on a cable. Also, each port processor may include a wireless communication interface such that the processor can transmit the information to a collection device. In a similar manner, to other described embodiments, connectivity information is not communicated between the panel processor 704 and the port processors 708.

Figure 8:
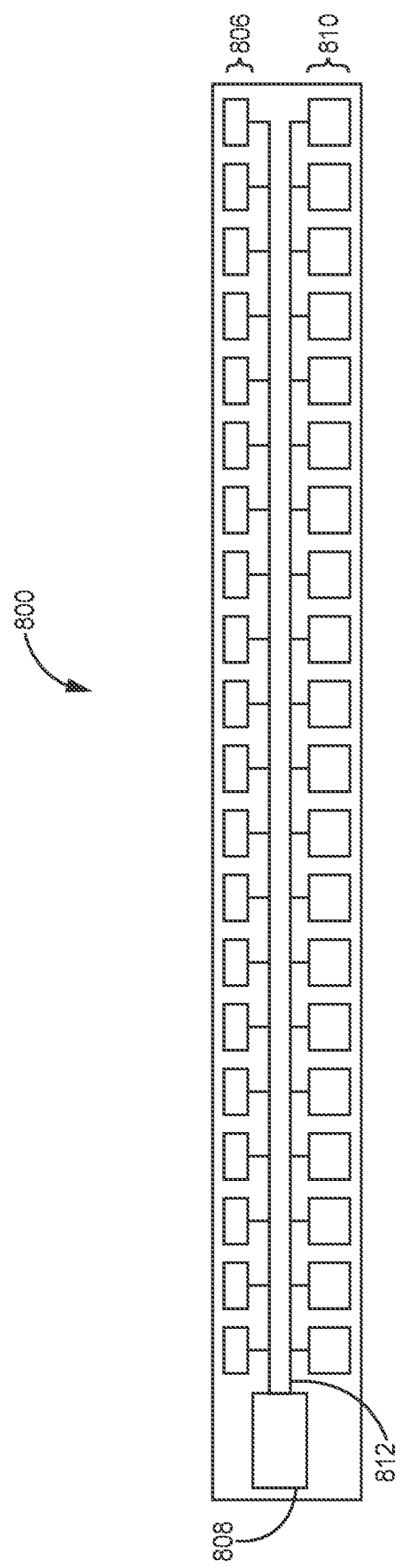
FIG. 8 is a block diagram illustrating an exemplary embodiment of a panel having ports that communicate with a panel processor.

FIG. 8 is a further embodiment of a panel 800 capable of supporting both the connectors having wireless communication interfaces and cables designed to provide managed connectivity using absolute technologies. Panel 800 includes a single panel processor 808 that provides id and inventory information to a collection device through a wireless communication interface. Further, the panel processor 808 may connect to multiple port interfaces 812, where each port interface in the multiple port interfaces 812 is associated with a single port in the multiple ports 810. Accordingly, connectivity information that is acquired from the connectors at each port in the multiple ports 810 is passed to the panel processor 808, where the panel processor 808 transmits the connectivity information to a collection device. Further, the panel processor 808 may drive the LEDs 806 such that the LEDs accurately represent the status of the ports 810.

Figure 9:
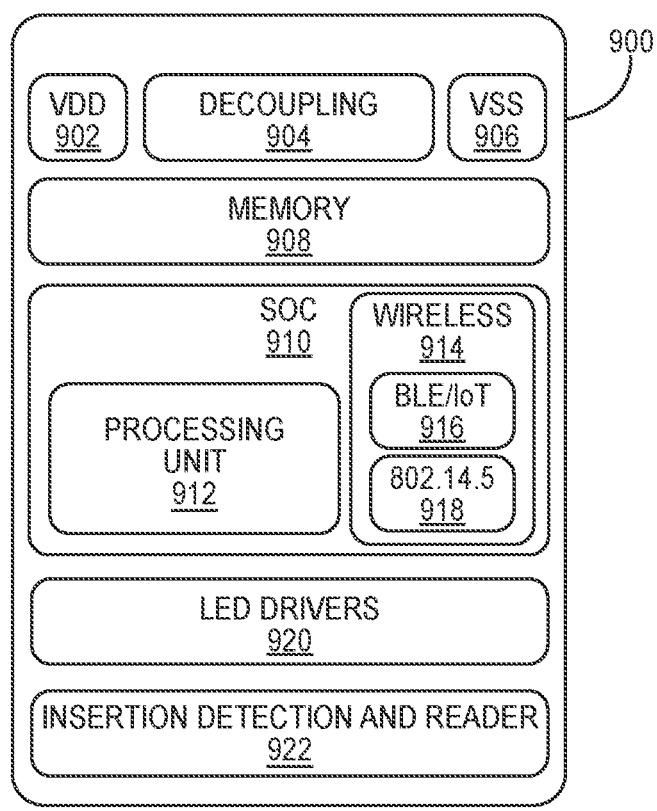
FIG. 9 is a block diagram illustrating an exemplary embodiment of a panel microcontroller that gathers connectivity information from connector plugs for transmission to a collection device through a wireless communication interface.

FIG. 9 is a block diagram illustrating a panel microcontroller 900 that may be implemented as a panel microcontroller 808 in a panel according to panel 800 in FIG. 8. The panel microcontroller 900 is similar to the panel microcontroller 300 in FIG. 3 with some exceptions. For example, the panel microcontroller 900 includes a VDD 902, decoupling 904, and VSS 906, which components function together to connect the panel microcontroller 900 to a power supply as understood by those having skill in the art. The panel microcontroller 900 uses the provided power to drive the several components in the panel microcontroller 900.

The panel microcontroller 900 further includes a memory 908 that functions in a similar manner to the memory 308 in FIG. 3. For example, the memory 908 may be an I2C or a single wire EEPROM. Further, the panel microcontroller 900 may include a system on chip (SOC) 910. The SOC 910 includes a processing unit 912 and a wireless communication interface 914. The processing unit 912 functions in a similar manner to the panel processor 312 in FIG. 3 and the wireless communication interface 914 functions in a similar manner to the wireless communication interface described in relation to wireless communication interface 314 in FIG. 3. For example, the processing unit 912 communicates with a collection device through the wireless communication interface 914. In certain implementations, the wireless interface 914 is capable of communicating through a variety of wireless standards such as a BLE/IoT wireless interface 916 or an 802.15.4 interface 918. As described above in relation to other wireless interfaces described herein, the wireless interface 914 is capable of other wireless standards known to one having skill in the art. The processing unit 912 may be a microprocessor or other device capable of providing the desired processing.

In certain embodiments, as part of these communications received through the wireless interface 914 from the PAN master/coordinator, the processing unit 912 processes commands received from the PAN master/coordinator that instruct the processing unit 912 how to control the port LEDs through LED drivers 920. The LED drivers 920 use the power received by the panel microcontroller 900 to drive the port LEDs. As discussed above with respect to panel 800 in FIG. 8, the panel microcontroller is coupled to detector and reader 922 for detecting and reading the insertion of plugs into ports of the panel associated with the panel microcontroller 900. For example, each port in the panel includes an interface through which the panel microcontroller 900 is able to read information from memory located on the plugs of the connectors that are inserted into the ports. The insertion detection and reader 922 acquires the information from the different ports and formats the information for transmission to the collection device.

Figure 10:
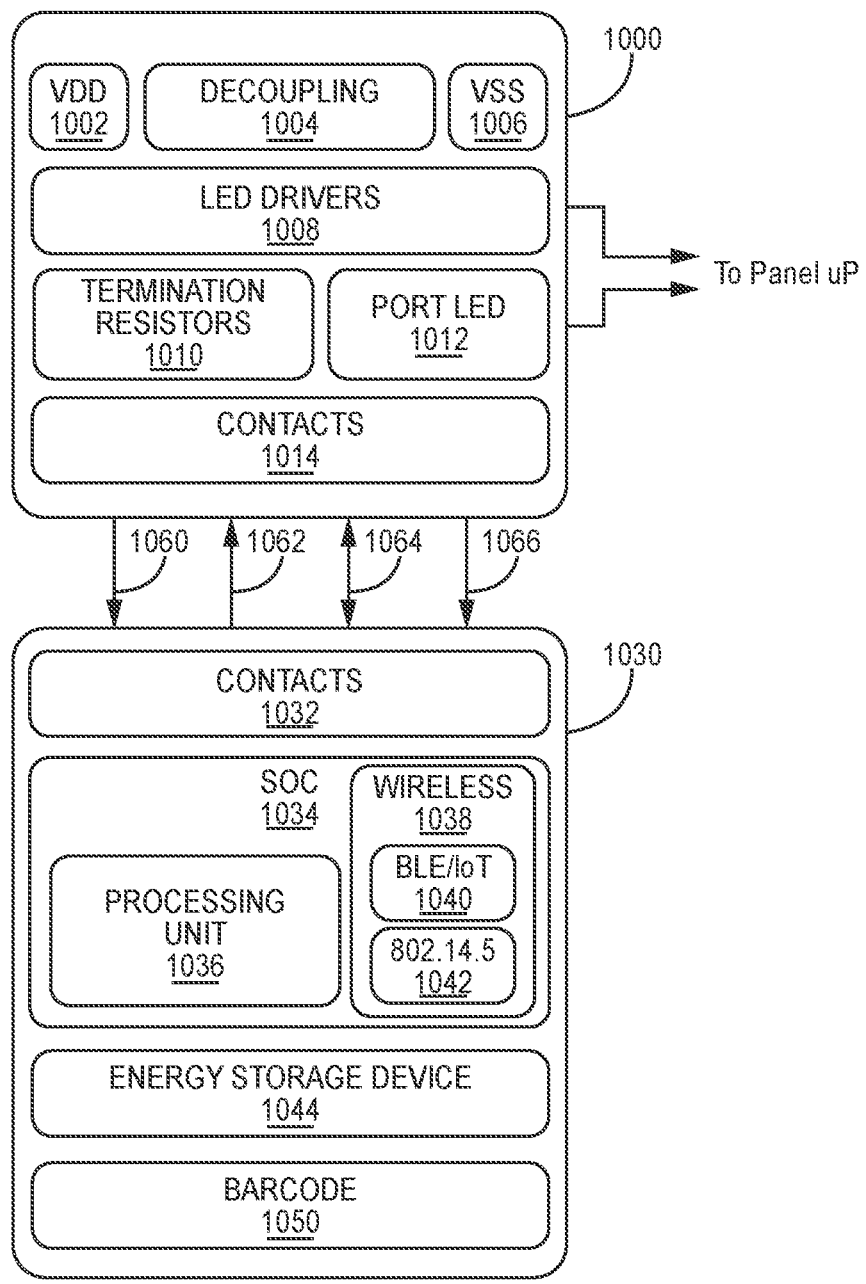
FIG. 10 is a block diagram illustrating an exemplary embodiment of a connector plug having a wireless communication interface that is connected to a port on a legacy panel.

FIG. 10 is a block diagram of one implementation of a panel port 1000 and a connector plug 1030 illustrating how the plug 1030 may connect to a panel port 1000 that is designed to provide managed connectivity using absolute technologies. As illustrated, the connector plug 1030 function substantially similar to the connector plug 630 in FIG. 6. In certain implementations, the SOC 1034 functions in a first state when the connector plug 1030 is connected to a panel port (such as panel port 600 in FIG. 6) that is designed to communicate port identification information to the connector plug for transmission by the connector plug to a collection device. However, when the connector plug 1030 is connected to a panel port that is designed to acquire managed connectivity information from the connector plug 1030, the SOC 1034 may function in a second state such that the SOC 1034 may disable the wireless interface 1038. In the second state, the SOC 1034 detects that the port does not transmit information to the connector plug 1030. Accordingly, the connector plug 1030 then disables the wireless interface 1038 and transmits identification information from the connector plug to the panel port 1000, through a NC 1060, a VSS 1062, an SDIO 1064, and a VDD 1066.

In at least one implementation, the SOC 1034 on the connector plug 1030 may determine whether it should receive connectivity information from a panel port 1000 upon the reception of power from the panel port 1000. Upon reception of power, the SOC 1034 may attempt to read flash memory that may or may not exist in the panel port 1000. If the SOC 1034 is able to read flash memory, then the SOC 1034 determines that the SOC 1034 will communicate connectivity information to a collection device or other management information through the wireless communication interface 1038. However, if the SOC 1034 is unable to read flash memory on the panel port 1000, the SOC 1034 determines that the panel port 1000 is implementing a different technology. In response to this determination, the SOC 1034 turns off the wireless communication interface 1038 and emulates a port suited to the technology implemented by the panel port 1000.

The panel port 1000 is a panel port 1000 that may be implemented in other systems that manage connectivity. For example, the panel port 1000 is illustrative of a panel port that may be implemented in a QUAREO system. As illustrated, the panel port 1000 receives power through VDD 1002, decoupling 1004, and VSS 1006. The panel port 1000 may communicate with a panel microprocessor, which panel microprocessor may control the panel port 1000. For example, the panel port 1008 may include LED control 1008, which controls the port LED 1012. In certain implementations, the LED control 1008 communicates with the panel microprocessor and controls the port LED 1012 as directed by the panel microprocessor. In a further implementation, the panel port 1000 includes contacts 1014 and termination resistors 1010. The contacts 1014 and termination resistors 1010 provide connections between the panel port 1000 and the connector plug 1030. When the panel port 1000 receives the connector plug 1030, the panel port 1000 may receive connector plug identification information from the connector plug 1030. The panel port 1000 may then communicate the information received from the connector plug 1030 to the panel microprocessor. The panel microprocessor may then communicate the information to a master/coordinator for managing the connectivity of the system containing the panel port 1000 and the connector plug 1030.

Figure 11:
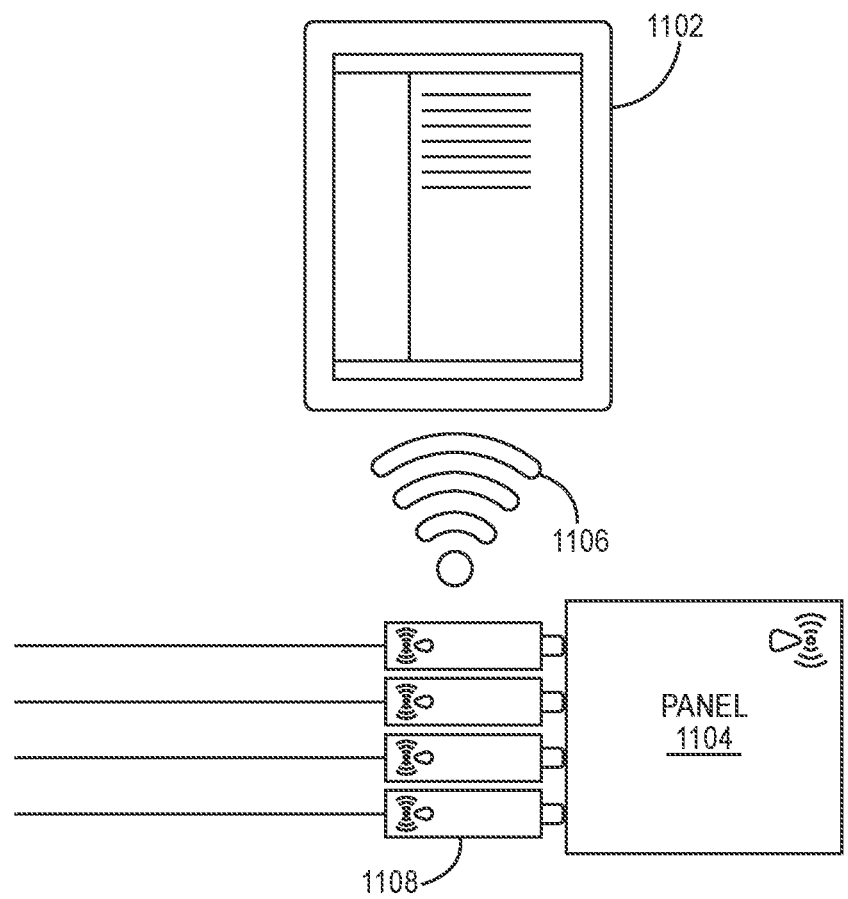
FIG. 11 is a diagram of an exemplary embodiment of a collector device gathering connectivity information from connector plugs.

FIG. 11 is a block diagram illustrating the collection of connectivity information by a collection device in one implementation. As illustrated, one or more connector plugs 1108 may be inserted into a panel 1104. The connector plugs 1108 may connect the ends of fiber optic cables, coaxial cables, Ethernet cables, or other cable suitable as a physical medium for communicating data to a suitable connective interface on the panel 1104. When a connector plug in the one or more connector plugs 1108 is connected to the panel 1104, the connector plug may receive power from the panel 1104. When the connector plug receives power, an SOC on the connector plug may determine that an insertion event has occurred. When the insertion event occurs, the SOC on the inserted connector plug may broadcast information related to the connector plug and information related to the panel port in the panel 1104 that received a connector in the one or more connectors through a wireless communication interface.

In certain implementations, a collection device 1102 may collect the information that is broadcast by connections plugs 1108 that are inserted into the panel 1104 through a communication link 1106. The collection device 1102 may be a mobile device, a laptop, a server or other electrical device that is able to communicate with the SOCs on the connector plugs 1108 through the communication link 1106. Further, the collection device 1102 may also include an IP stack that enables the collection device 1102 to communicate with a connection management system through an IP network. The collection device 1102 may also communicate with the panel 1104 through the communication link 1106. In at least one exemplary implementation, the collection device 1102 also receives directions to provide to the panel 1104 and the connection plugs 1108, where the directions are received from a management system. For example, a management system may provide directions for the panel 1104 instructing the panel 1104 how to drive LEDs associated with particular panel ports.

In a further implementation, the connector plugs 1108 and panels 1104 may be assigned addresses. The addresses may be 6 byte IEEE 802 MAC addresses. Alternatively, the addresses may be generated as random 6 byte numbers. When the addressing is randomly generated, the collection device 1102 may implement collision resolution to prevent different components from having the same address. In a further implementation, the addresses may be assigned the panel or cable CPID value. Other types of addressing are also possible.

Figure 12:
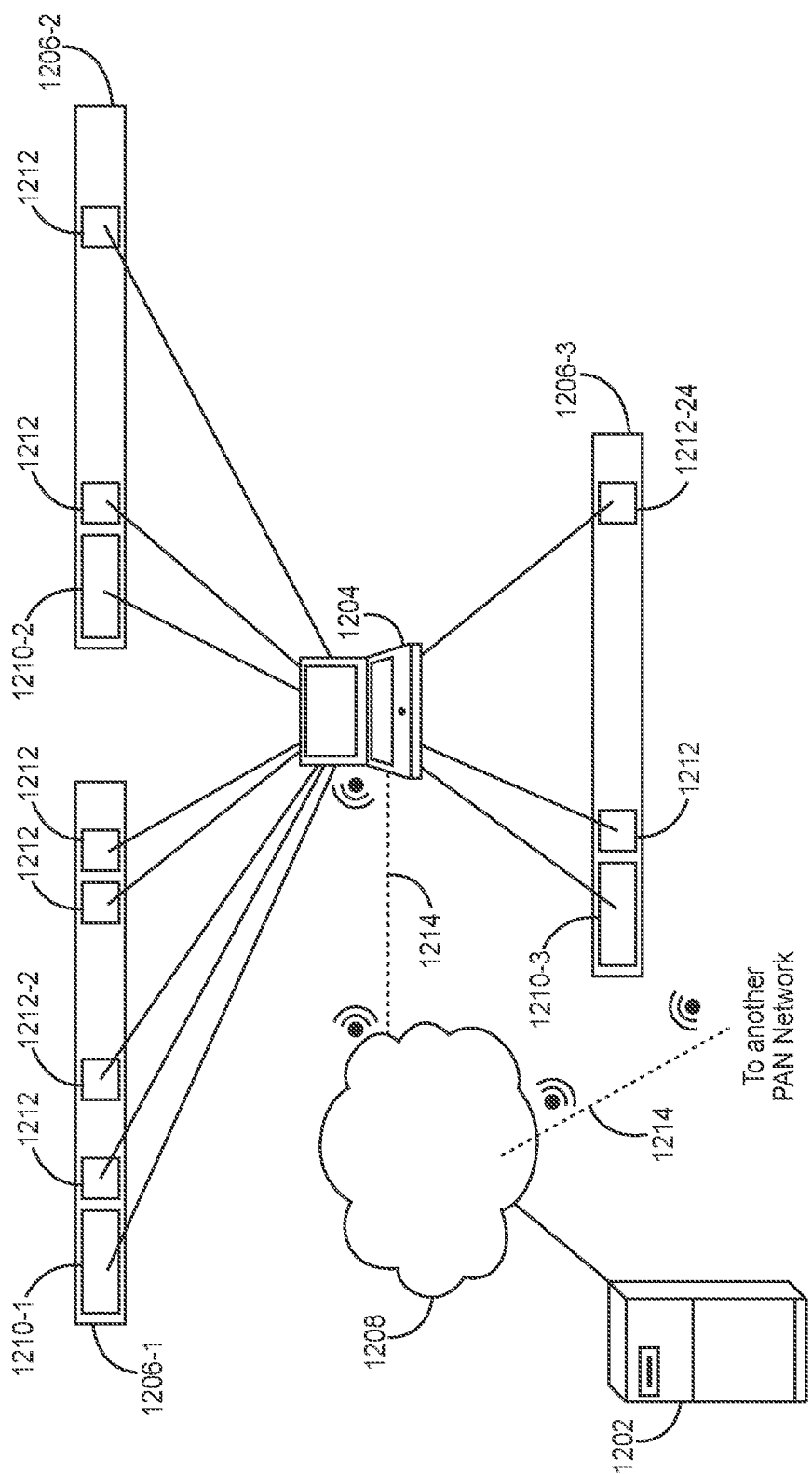
FIG. 12 is a block diagram of an exemplary embodiment of a network that gathers connectivity information, where the network is arranged in a star topology.
Figure 13:
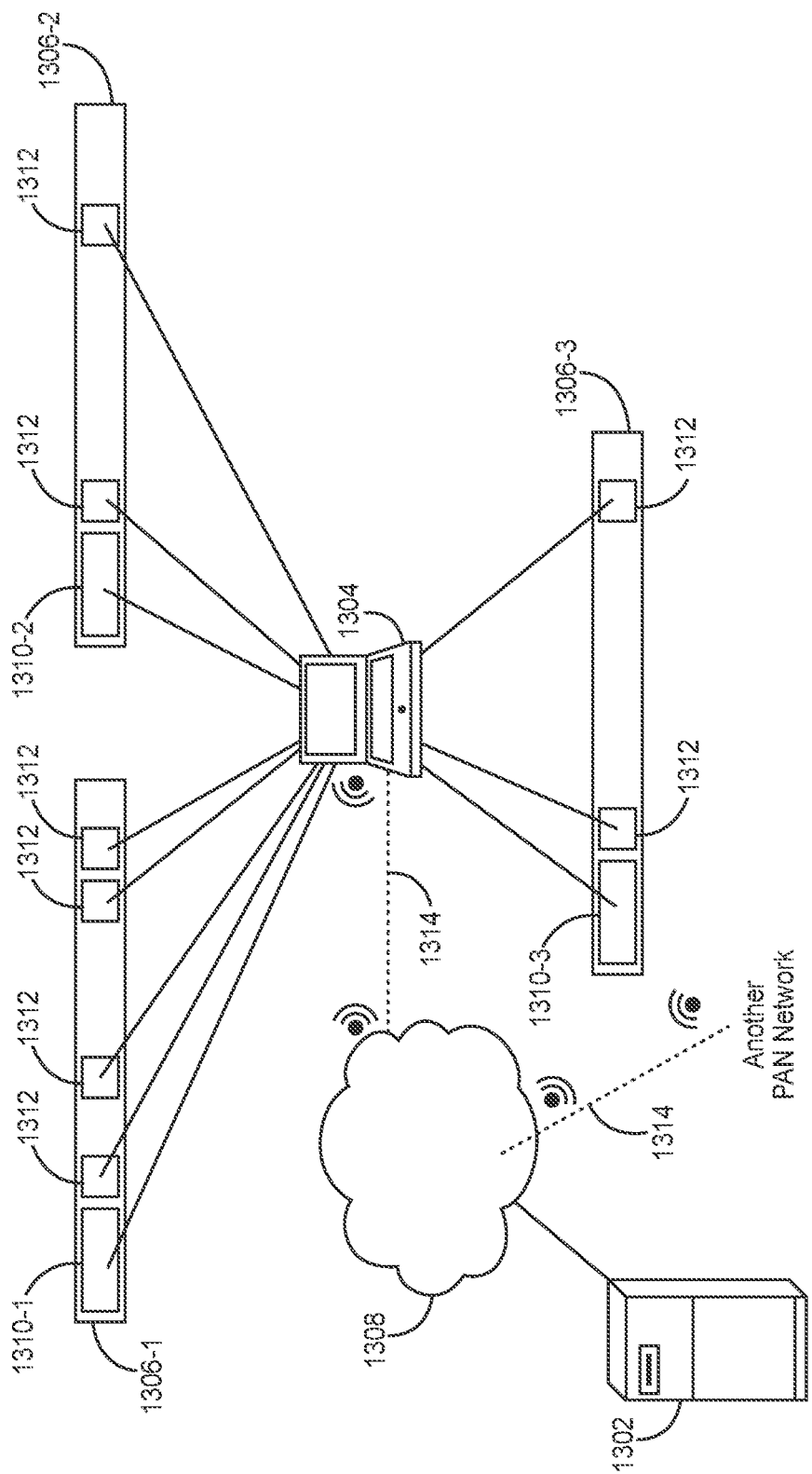
FIG. 13 is a block diagram of an exemplary embodiment of a network that gathers connectivity information, where the network is arranged in a star topology.

FIGS. 12 and 13 illustrate different examples of connecting panels, connectors, and collection devices in a star network topology. FIG. 12 illustrates the connection of panels 1206-1-1206-3, ports 1212, and a collection device 1204 in a star network topology, where a connector inserted into a port transmits connectivity information for the respective port 1212. As illustrated, the reference number 1212 refers to a combination of a connector inserted into a port, such that the connector is transmitting connectivity information, as used herein, the reference number will be applied to the ports 1212. As further illustrated, connector plugs inserted into the different ports 1212 form communication links with the collection device 1204. Further, each panel 1206-1-1206-3 includes a respective panel processor 1210-1-1210-3. The panel processors 1210-1-1210-3 also may form communication links with the collection device 1204. As described above, the communication links between the panel processors 1210-1-1210-3, the connectors, and the collection device 1204 may be formed using technologies suited for personal area networks, such as Bluetooth, Bluetooth Low Energy, Zigbee, or other technology suited for use in personal area networks. As shown, the connectors in the ports 1212 communicate connectivity information to the collection device 1204 regarding the ports 1212 and connectors. The panel processors 1210-1-1210-3 communicate connectivity information to the collection device 1204 regarding their respective panels 1206-1-1206-3.

In certain embodiments, a connector may be inserted into port 1212-2 of panel 1206-1. The connector in port 1212-2 may then transmit an insertion event to the collection device, and ultimately to the management system saying that an insert event has occurred for panel 1206-1 at port 1212-2. The insert event may also describe the cable ID (For example, 123456789012.1) plus other additional characteristics. Further, the other end of the cable may be inserted into panel 1206-3 port 1212-24, and the connector inserted into port 1212-24 may then transmit an insertion event. The insertion event may identify panel 1206-3, port 1212-24, the cable ID that matches the cable ID associated with port 1212-2, plus additional characteristics. The management system sees that the cable ID is the same for both ports 1212-2 and 1212-24. The management system may then determine that the cable is the same for both of the ports and that the cable connects panel 1206-1 port 1212-2 to panel 1206-3 port 1212-24, and that cable end.1 is in 1206-1 port 1212-2, and cable end .2 is in panel 1206-3 port 1212-24. The management system may then also correlates panel 1206-1 with building 5, floor 2, cabinet 7, slot 5, and knows that cable end 1 is located at that physical location in the network.

In at least one exemplary implementation, the collection device 1204 is connected to an IP network 1208 through an IP communication link 1214. The collection device 1214 may be connected to the IP network 1208 through a Wi-Fi connection, XBase-T Ethernet wired connection, 3G or 4G cellular connector, or other technology suitable for connecting a device to an IP network 1208. Through the IP network 1208, the collection device 1204 communicates with a connection management system 1202. The connection management system 1202 manages the connectivity for the network. Further, the connection management system 1202 may also provide an interface to a user for controlling and monitoring the network. As illustrated, the connection management system 1202 may be connected to one or more personal area networks through the IP network 1208. In certain implementations, the connection management system receives connectivity information from the collection device 1204 and manages the connectors inserted into the ports 1212 and the panel processors 1210-1-1210-3. For example, the connection management system may provide commands to the panel processors 1210-1-1210-3 instructing the panel processors 1210-1-1210-3 how to drive the LEDs of their respective panel 1206-1-1206-3. In certain implementations, and possibly in smaller networks, the collection device 1204 may operate as a connection management system 1202, or the collection device 1204 may be able to provide some management functionality when the collection device 1204 is not connected to the IP network 1208.

FIG. 13 illustrates the connection of panels 1306-1-1306-3, connectors 1312, and a collection device 1304 in a star network topology, where panel processors 1310-1-1310-3 broadcast connectivity information for the ports and connectors 1312. The collection device 1304 functions in a similar manner to collection device 1204 described above with respect to FIG. 12, with the exception that the collection device 1304 does not gather connectivity information from connectors associated with the ports 1312. In contrast to FIG. 12, the panel processors 1310-1-1310-3 gather connectivity information from their respective ports 1312 and the connectors associated with their ports 1312. The panel processors 1310-1-1310-3 then transmit the information to the collection device 1304. The collection device 1304 may then transmit the connectivity information to the management system 1302 in a similar manner as described above with respect to the collection device 1204 and the management system 1202 in FIG. 2. Further, the management system 1302 and the collection device 1304 may provide commands to the panel processors 1310-1-1310-3 that control and configure the panels, ports, and connectors.

In certain implementations, a management system (such as management systems 1202/1302) may be connected to multiple collection devices, where each collection device is associated with a different personal area network. In at least one example, a management system may be connected to a collection device such as collection device 1204 that communicates with the connectors in the ports 1212 and the management system may also be connected to a collection device such as collection device 1304 that communicates with the panel processors 1310-1-1310-3. In a further implementation, a collection device communicates with a set of panels that includes combinations of panels like panels 1206-1-1206-3 and 1306-1-1306-3.

Figure 14:
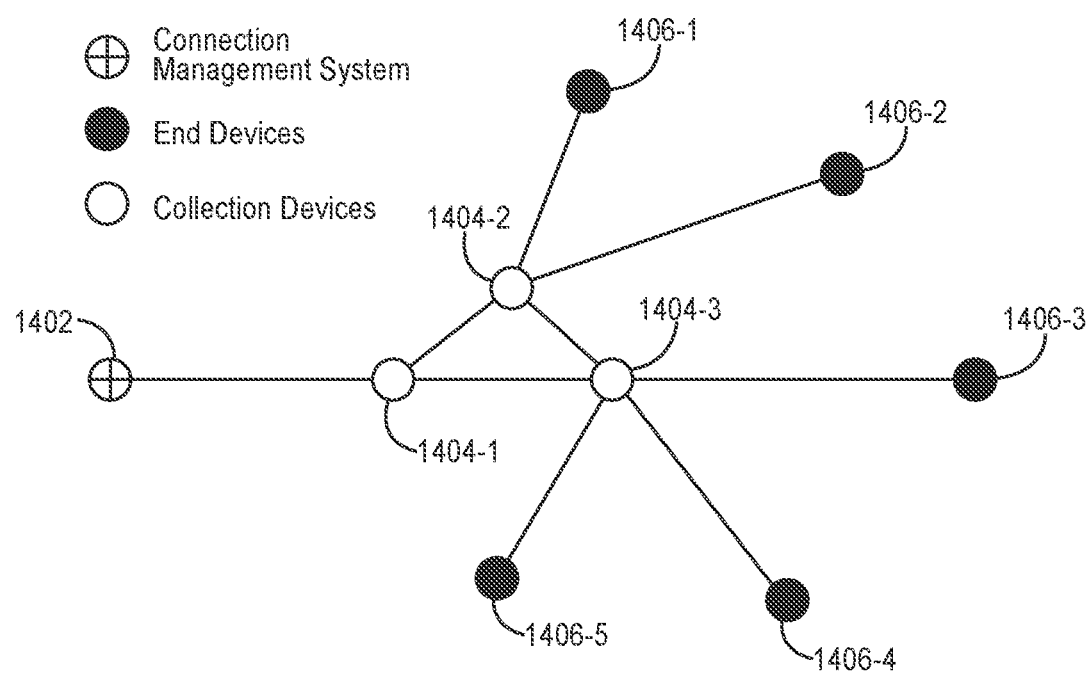
FIG. 14 is a diagram of an exemplary embodiment of a network that gathers connectivity information, where the network is arranged in a mesh topology.

As FIGS. 12 and 13 describe different implementations of star network topologies, personal area networks for managing connectivity may be arranged into different topological arrangements. For example, FIG. 14 illustrates a personal area network that is arranged in a mesh topology. As illustrated, the personal area network may include a connection management system 1402. The connection management system 1402 may function similarly to the management system described above with respect to FIGS. 12 and 13. As shown, the connection management system 1402 communicates with a collection device 1404-1 through an IP communication link as described above with respect to FIGS. 12 and 13. As shown, the connection management system 1402 receives data collected from the multiple components in the network from a single collection device 1404-1. As illustrated, the collection devices 1404-1-1404-3 include devices that receive data from at least one device and provide the collected data to another device. For example, the collection device 1404-1 collects data from collection devices 1404-2 and 1404-3 and provides the collected data to the connection management system 1402. The collection devices 1404-2 and 1404-3 collect data from end devices 1406-1-1406-5 in the network. The end devices 1406-1-1406-5 are devices that produce data for communication to and receive data produced by the connection management system 1402. The end devices 1406-1-1406-5 include panel processors and connector plugs as discussed above. As described, through the mesh topology the end devices 1406-1-1406-5 can be managed by the connection management system 1402. In some implementations, panel devices may also function as nodes 1404 and relay information to other nodes in the mesh or to the management system. When a panel is a 1404 node, it may produce data for communication to and receive data produced by the connection management system 1402. It may also relay data, when the panel is not the final destination.

Figure 15:
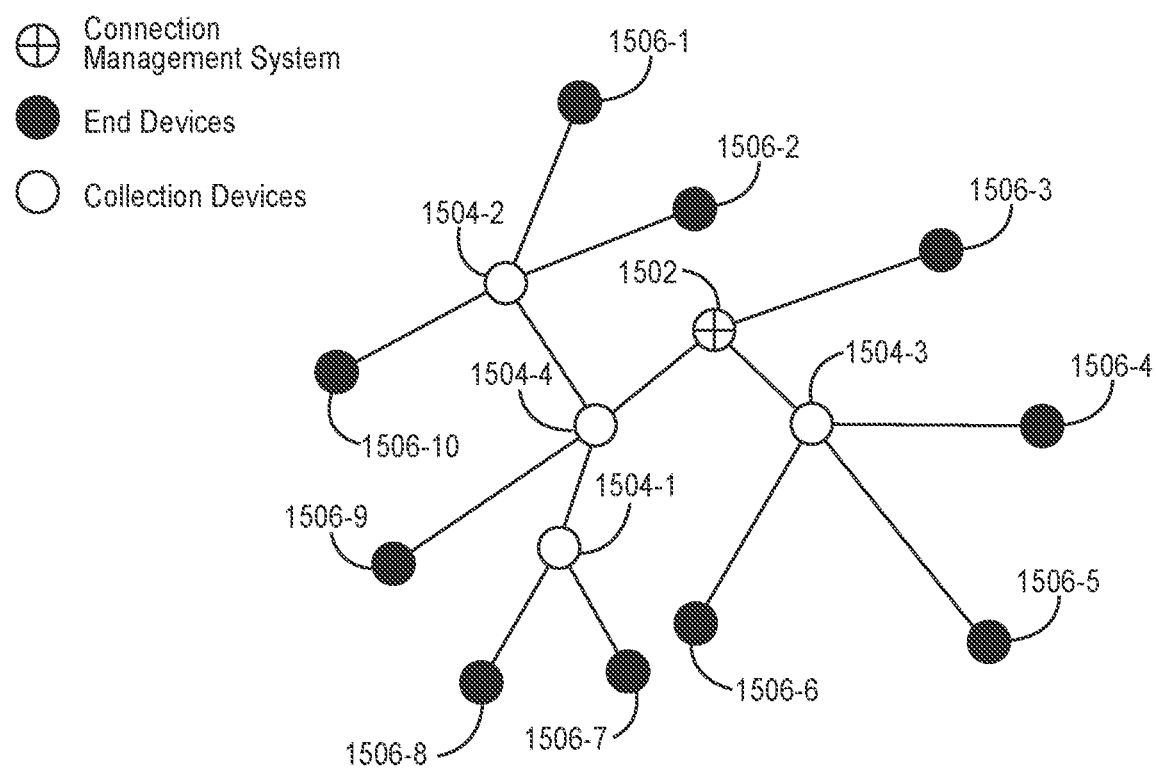
FIG. 15 is a diagram of an exemplary embodiment of a network that gathers connectivity information, where the network is arranged in a tree topology.

FIG. 15 illustrates a personal area network that is arranged in a tree topology. As illustrated, the personal area network may include a connection management system 1502. The connection management system 1502 may function similarly to the management system described above with respect to FIGS. 12 and 13. As shown, the connection management system 1502 communicates with multiple collection devices 1504-2-1504-4 through different communication links, which may be an IP communication link as described above with respect to FIGS. 12 and 13. As shown, the connection management system 1502 receives data collected from the multiple components in the network. As illustrated, the collection devices 1504-1-1504-4 include devices that receive data from at least one device and provide the collected data to another device. For example, the collection device 1504-1 collects data from end devices 1506-7-1506-8 and provides the collected data to the collection device 1504-4, which collection device 1504-4 provides the collected data along with data from end device 1506-9 to the connection management system 1502. The collection devices 1504-2 and 1504-3 also collect data from various end devices. For example, collection device 1504-2 collects data from end devices 1506-1, 1506-2, and 1506-10, while collection device 1504-3 collects data from end devices 1506-4-1506-6 in the network. The end devices 1506-1-1506-10 are devices that produce data for communication to and receive data produced by the connection management system 1502. The end devices 1506-1-1506-10 include panel processors and connector plugs as discussed above. In certain implementations, the different end devices and collection devices may implement different technologies. For example, in one implementation, the end devices 1506-7 and 1506-8 may be panel processors described in FIGS. 8 and 13, while the end devices 1506-4-1506-7 may be connector plugs as described in FIG. 6. Further, the end device 1506-3 may be a panel processor that includes an IP network interface and, accordingly, may communicate directly with the connection management system 1502. As discussed above, the personal area networks may be arranged into star, mesh, and tree topologies. These different topological arrangements are exemplary and other topologies may be implemented as understood by one having skill in the art. In a similar manner as described above, in regards to FIG. 14, a panel may also function as a collection device 1504, where the panel processor is able to function as a relay device in a network arranged in a tree topology.

Figure 16:
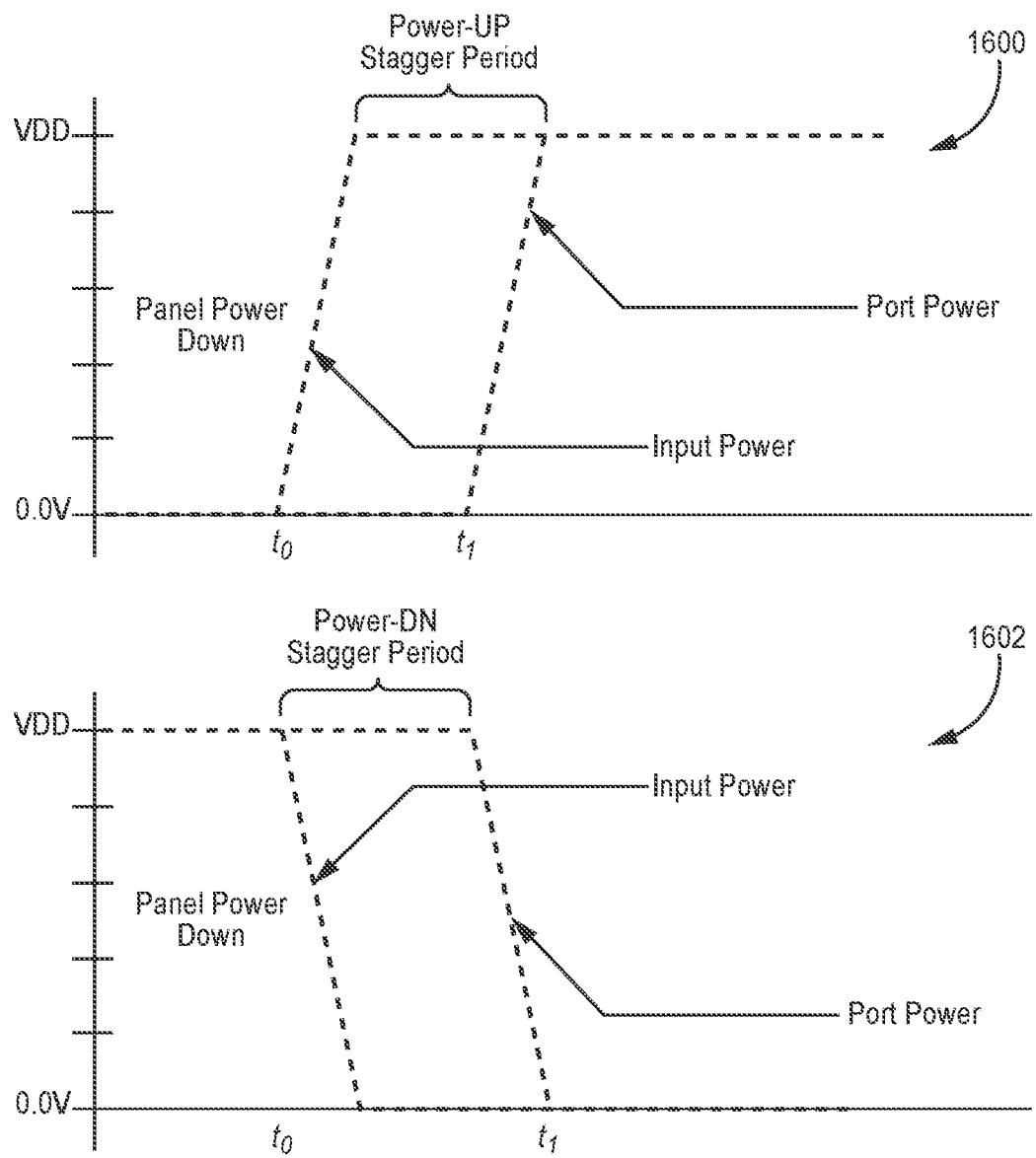
FIG. 16 is a series of graphs illustrating an exemplary embodiment of power staggering.

As described above with respect to power staggering controller 322 in FIG. 3. In certain embodiments, the monitoring of the insertion or removal of connectors from a panel port is reliant on the power that is provided to the panel. FIG. 16 illustrates different graphs illustrating the time difference between when a panel gains or loses power and when the panel port gains or loses power. For example, graph 1600 illustrates that when power is provided to the panel, there exists a power up stagger period before power is provided to a port in the panel. In certain implementations, this power up stagger period may be different for different ports in a panel. In a similar manner, graph 1602 illustrates that when a panel is power downed due to the removal of power or a power disruption, there exists a power down stagger period. The power down stagger period may also be different for different ports in a panel. As described above, the stagger period may help in preventing congestion from occurring due to power events as the staggering prevents the power events from being experienced simultaneously for the various panels and ports in a personal area network.

In further implementations, the stagger period also helps to insure that the panel port are operating correctly so that a connector plug is able to differentiate between a power up/down event and an insertion/disconnect event. For example, a SOC on a connector plug (such as SOC 634 in FIG. 6) does not operate until the SOC receives power from the panel port to which the connector plug is connected. The SOC may receive power when it is inserted to an operating port in a panel or when a panel receives power, where the connector plug is already connected to the panel. In the event that the SOC receives power, the SOC is able to determine whether power comes from an insertion or the turning on of the panel. For example, when inserted, the SOC may check a stored state to see if the state is connected or disconnected. If the state is connected, the SOC determines that the received power came from a power up event, the SOC will then resume normal operation. However, if the state is disconnected, the SOC determines that the received power came from an insertion event. When the SOC determines that an insertion event has occurred, the SOC changes the state to connected. Further, when an insertion event occurs, the SOC may also update port and plug insertion counts, transmit plug and port information to a collection device, and receive acknowledgement from the collection device.

Further, when the connector plug loses power, the SOC is able to determine whether the loss of power is the result of a power down event or a disconnection of the connector plug from the associated panel port. To differentiate the power down event from a disconnection event, the SOC attempts to read the panel port memory. If the SOC is able to read the memory and the state is connected, the SOC determines that the loss of power is from a power down event. If the state is disconnected, the SOC will change the state to connected and communicate with the collection device as if an insertion event occurred. However, if the SOC is unable to read the panel port memory, and the state is connected, the SOC changes the state to disconnected. Also, the SOC may clear port data from plug memory, transmit a disconnect message to a collection device, and optionally receive an acknowledgement of the disconnect message from the collection device. If the SOC is unable to read the panel port memory and the state is disconnected, the SOC will keep the state as disconnected. Thus, the connector plug may determine whether the reception or loss of power is due to a power up/down event or an insertion/disconnection event.

Figure 17A:
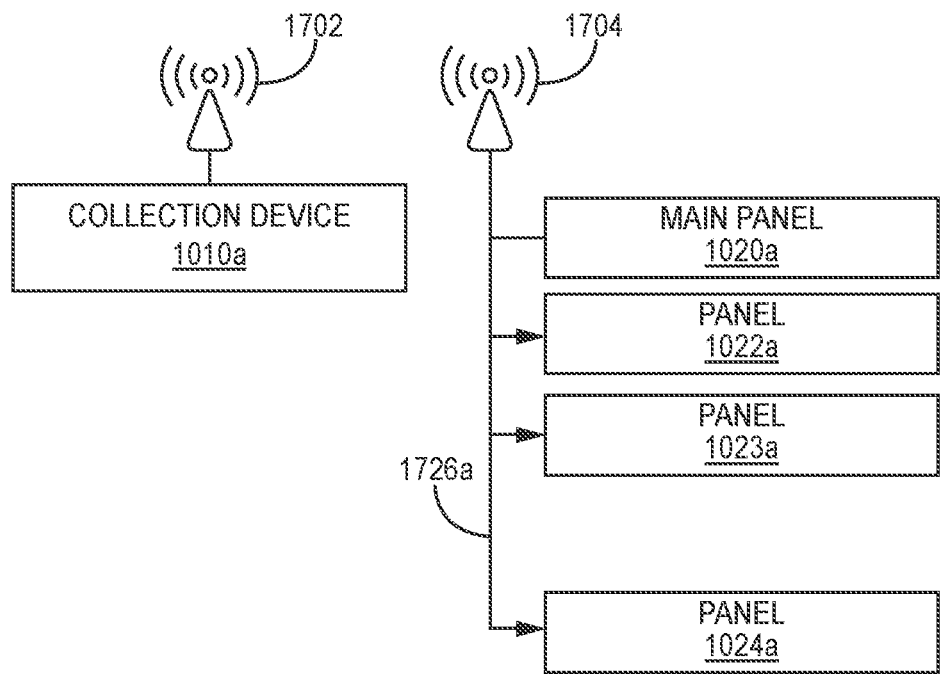
FIGS. 17A and 17B are block diagrams illustrating different exemplary embodiments for gathering connectivity information in different environments.
Figure 17B:
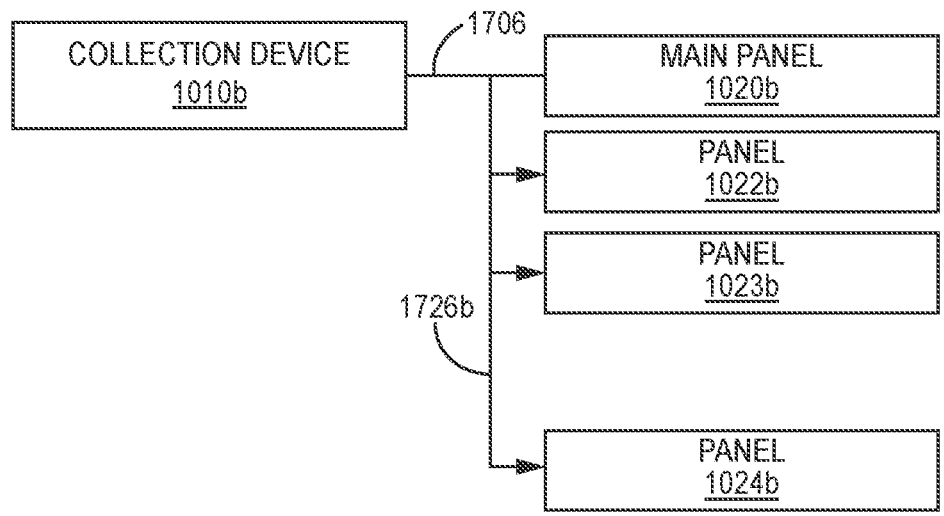

In certain implementations, the panels may be mounted within racks and/or cabinets. As the panels and connector plugs in the panel port communicate wirelessly, radio propagation and directivity of the wireless signals may be a concern. In particular, the wireless signals transmitted by the connector plugs may be transmitted at low powers. As the panels and connector plugs may be confined within cabinets, the structure of the cabinet may interfere with the transmission of the signals between the panels, connector plugs, and a management system. FIGS. 17A and 17B illustrate different implementations that aid communication between the panels, connector plugs and the collection device when panels are mounted within a cabinet. For example, in FIG. 17A, a main panel 1020*a* and panels 1022*a*-1024*a* are connected to an RF bus 1726*a*. The RF bus 1726*a* is connected to an antenna 1704. The main panel 1020*a* and panels 1022*a*-1024*a* transmit information for the collection device 1010*a* through the RF bus 1726*a* and the antenna 1704. The collection device is coupled to an antenna 1702 and is able to receive and transmit information for the main panel 1020*a* and panels 1022*a*-1024*a* through the antenna 1702. FIG. 17B provides an alternative solution where a main panel 1020*b* and panels 1022*b*-1024*b* are coupled to an RF bus. The RF bus may connect to a coaxial cabled link 1706, which may be discrete coaxial cable or a PCB based transmission line. Connectivity information may then be transmitted between the main panel 1020*b* and panels 1022*b*-1024*b* and the collection device 1010*b*. Accordingly, panels and connector plugs in a cabinet may still communicate connectivity information to their respective management systems.

FIGS. 18-25 provide various sequence diagrams that exemplify cable and panel message flows. In certain configurations, endpoints (such as panels and connector plugs) may be able to select a channel for transmission. Cable and ports may use port numbers to map to a channel, and reduce collisions. For example, port N maps to channel N or something similar. Panels may also map to particular channels based on a panel ID. Other configurations for channel selection may be used including the random selection of a channel.

Figure 18:
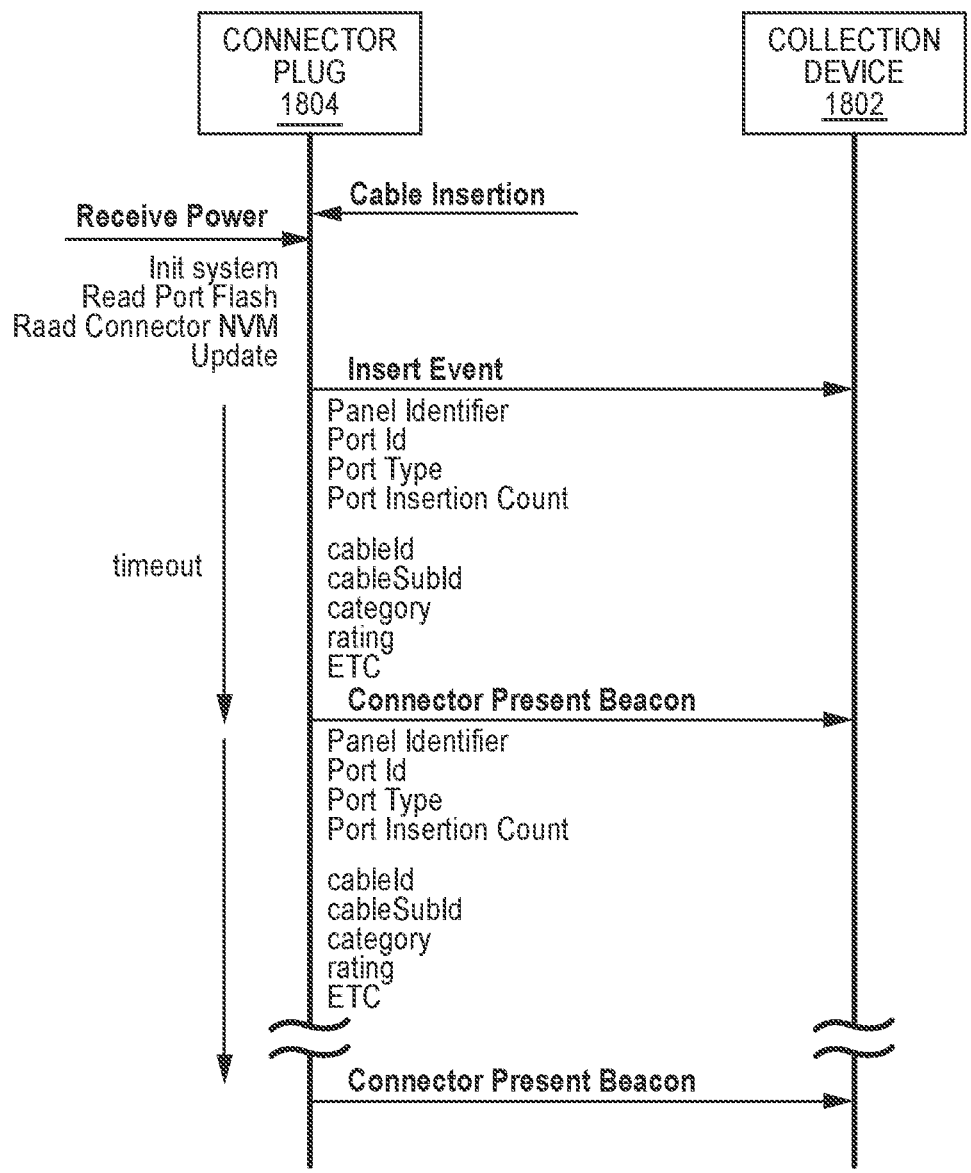
FIG. 18 is a sequence diagram of message flows in an exemplary embodiment for detecting the insertion of a connector plug into panel port.

FIG. 18 is a sequence diagram illustrating a possible sequence of message flows when a connector plug 1804 is inserted into a panel. On cable insertion, the connector plug 1804 receives power from the panel. The connector plug 1804 then initializes, and reads the panel port flash data, and its internal connector data that defines the cable id and other characteristics. The connector plug 1804 may update data such as incrementing a port and connector insertion count. Further, the connector plug 1804 may then issue an insertion event using a layer 2 broadcast address. If the address of the collection device 1802 is known, the connector plug 1804 may send the insertion event message directly using a master unicast address. Optionally, after a timeout, the connector plug 1804 may issue a connector present beacon, containing the same information as the insertion event. The connector plug 1804 may periodically issue the connector present beacon after each subsequent timeout. In certain implementations, after receiving the insertion event, the collection device 1802 may optionally send an ack message, which may signal to the connector plug 1804 to stop transmitting beacons. In at least one exemplary implementation, the personal area network communication protocol that governs communication between the collector plug 1804 and the collection device 1802 may restrict the size of the message such that all of the insertion data is unable to be transmitted to the collection device 1802 in a single transmission. In such circumstances, the collection device 1802 may set up a connection after receiving the insertion event, request additional cable characteristics, and then disconnect the connection after the desired cable characteristics are received.

Figure 19:
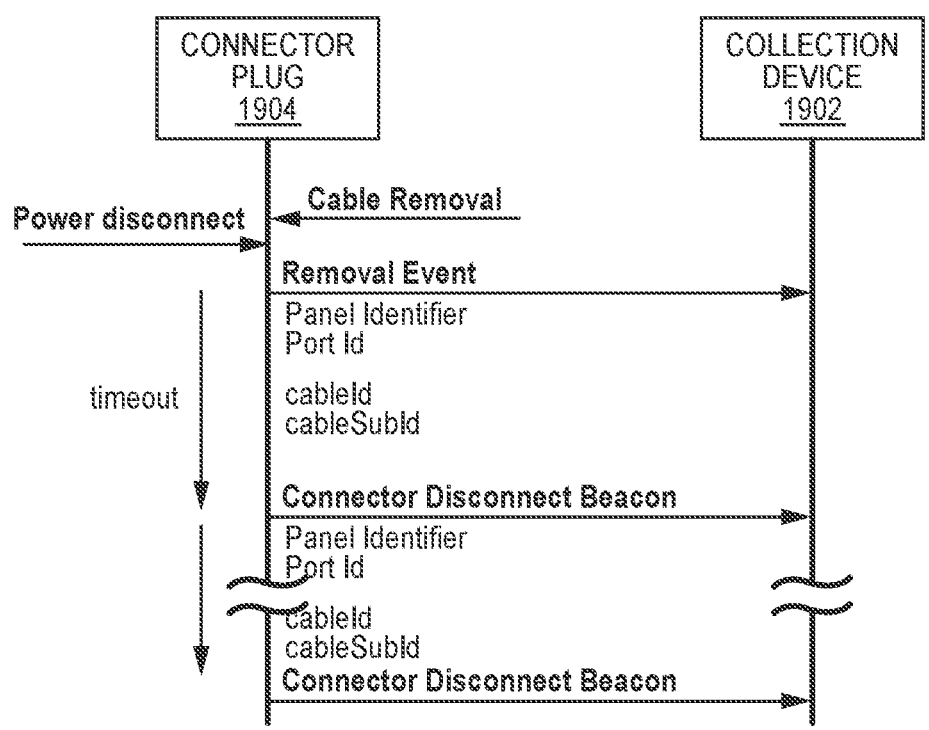
FIG. 19 is a sequence diagram of message flows in an exemplary embodiment for detecting the disconnection of a connector plug from a panel port.

FIG. 19. is a sequence diagram illustrating a possible sequence of message flows when a connector plug 1904 is removed from a panel. When a cable is removed from a port, the connector plug 1904 loses the supply of power from the panel power supply. However, internal power storage on the plug may be used for a short time such that the connector plug 1904 may transmit a removal event to a collection device 1902. After the connector plug 1904 transmits the removal event, the connector plug 1904 may wait for time to elapse and when the time has elapsed or timed out, the connector plug 1904 may transmit a cable disconnect beacon. The connector plug 1904 may transmit the cable disconnect beacon periodically after each successive timeout until the power stored in the internal power storage on the connector plug 1904 becomes exhausted or an "ACK" is received from the collection device 1902.

Figure 20:
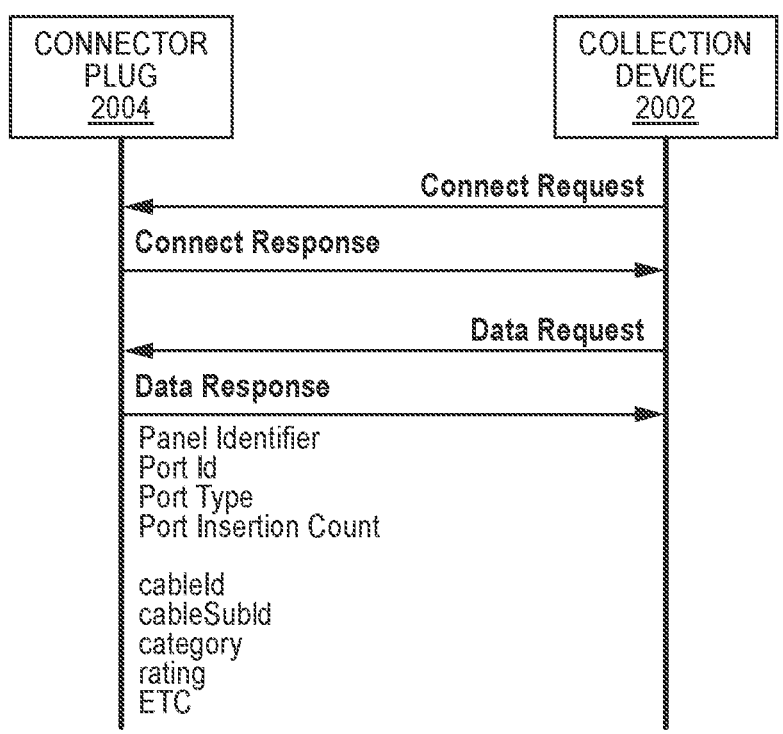
FIG. 20 is a sequence diagram of message flows in an exemplary embodiment for handling the connect requests.

FIG. 20 is a sequence diagram illustrating a possible sequence of message flows for when a collection device 2002 requests cable information for a specific cable. For example, the collection device 2002 may send a connect request to a connector plug 2004. The connector plug 2004 may respond with a connect response to notify that a connection between the connector plug 2004 and the collection device 2002 has been formed. When the collection device 2002 receives the connect response the collection device 2002 sends a data request to the connector plug 2004, where the data request requests information regarding the connector plug 2004. Upon receiving the data request, the connector plug 2004 transmits the requested data to the collection device 2002.

Figure 21:
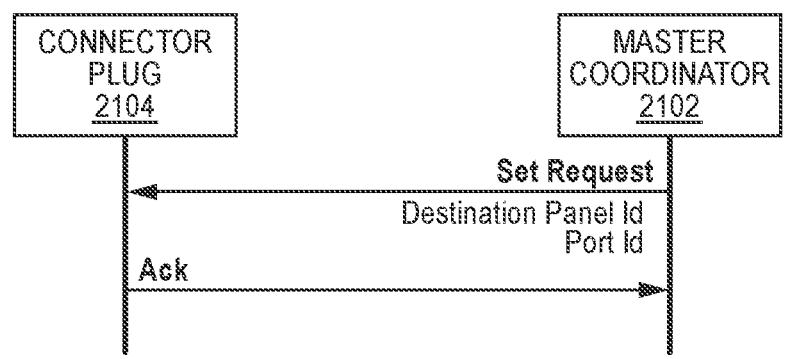
FIG. 21 is a sequence diagram of message flows in an exemplary embodiment for handling set requests.

FIG. 21 is a sequence diagram illustrating a possible sequence of message flows for when a collection device 2102 sets data in an end device of a managed connectivity system, like a connector plug 2104 that is connected to a particular port. For example, the master coordinator 2102 may send a set request that sets a destination panel ID and a port ID on the connector plug 2104 of a destination panel ID and a port ID. After receiving the data, the connector plug 2104 then responds with an acknowledgement to indicate that the connector plug 2102 has received the set request or set the data as dictated by the collection device 2102. In other examples, the set data values could be associated with a specific pot LED, and specific values may be interpreted as instruction to turn on/off, drive the LED to present a specific color, and/or cadence of the LED. In some implementations, the cadence may be a separate data variable. The data value may also be used to set LEDs that may exist on a connector plug 2104, which embodiment is described below with respect to FIGS. 31A-32C. In some situations, the connector plug 2104 may not be in a panel, but the connector plug 2102 may still respond if the connector plug has sufficient power stored up for responding. Further options may include sending write location values to the panels, enable or disable ports, disable panel, turn panel identifier LED on and off, and the like.

Figure 22:
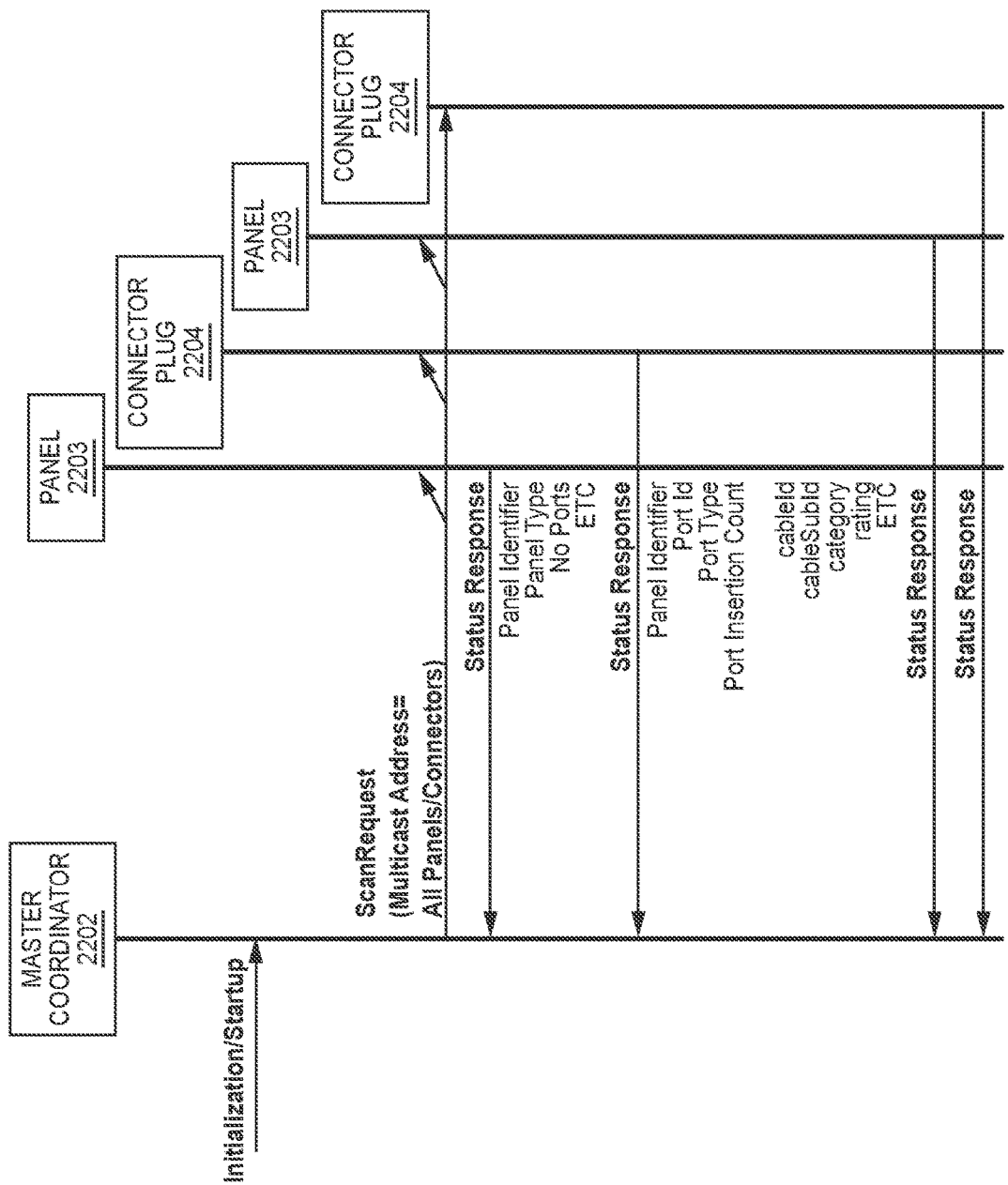
FIG. 22 is a sequence diagram of message flows in an exemplary embodiment for acquiring status from components in response to a multicast request.

FIG. 22 is a sequence diagram illustrating a possible sequence of message flows showing a collection device 2202 that scans a network to retrieve information of panels 2203 and connector plugs 2204 within a network. In certain implementations, when a collection device 2202 is initially powered on, the collection device 2202 may have no knowledge of available panels 2203 and connector plugs 2204 within the active network. The collection device 2202 may scan the network to retrieve information regarding the available panels and cables that are active in the network.

In certain implementations, where multicast addresses are supported in the network, to scan the network for active and available panels, the collection device 2202 may send a scan request using a predefined multicast address. In some implementations, the collection device 2202 may send the scan request to a private address, where all the devices in the network are configured with the same private address. When the collection device 2202 sends the scan request using the multicast address, the panels 2203 and the connector plugs 2204 may be preconfigured with the multicast address. The panels 2203 and the connector plugs 2204 may receive the scan request and respond with a status response message. In some examples, the status response message may return the status of the device and may be similar to a connector present beacon or panel present beacon. In at least some examples, the panels 2203 and connector plugs 2204 may select a random delay time between 0 and specified time before responding, where the selection of a random time may reduce collisions between responders. Other collision avoidance methods may also be used. After the panels 2203 and connector plugs 2204 respond, the collection device 2202 becomes aware of the different active devices that exist within the network.

Figure 23:
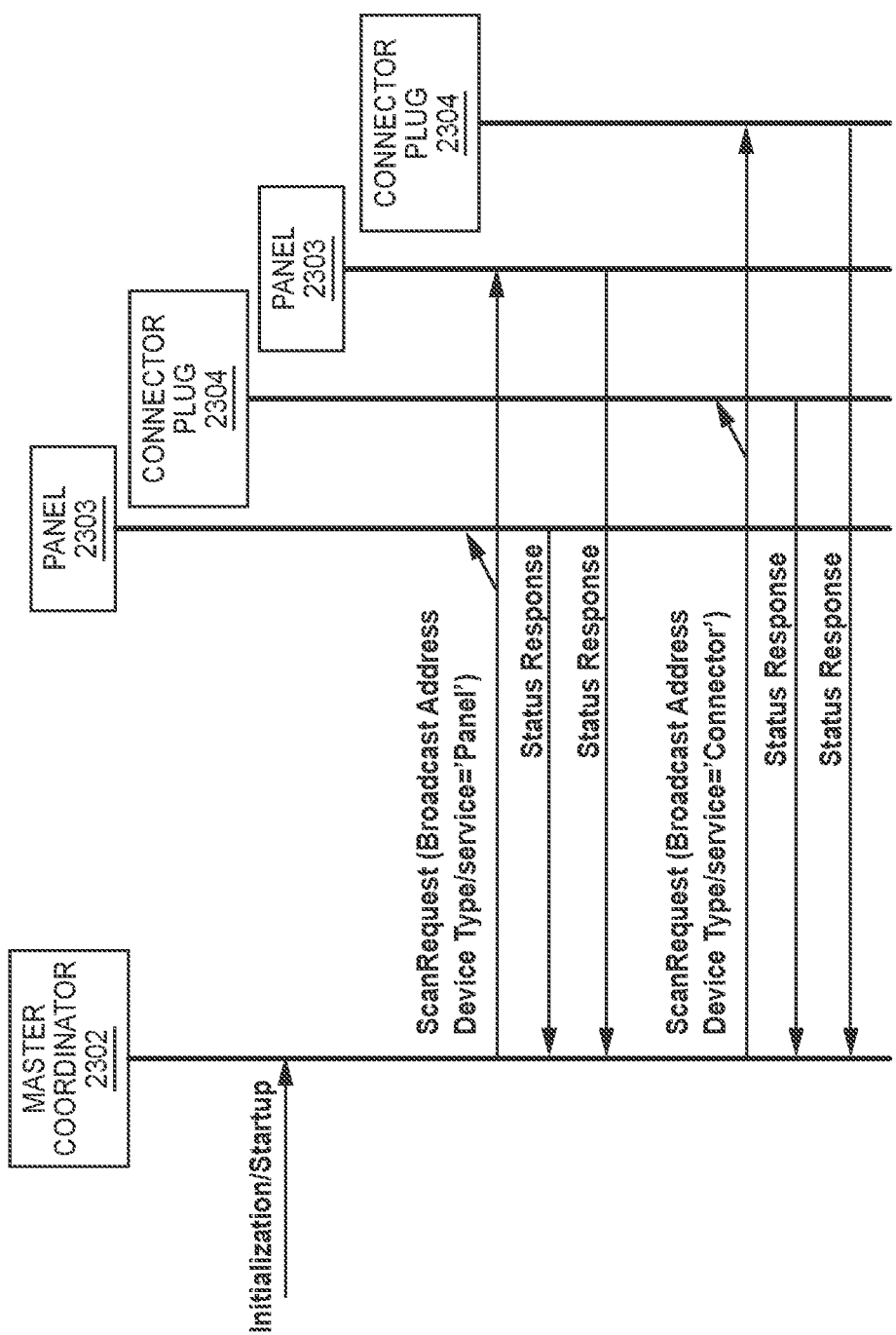
FIG. 23 is a sequence diagram of message flows in an exemplary embodiment for acquiring status from components in response to a series of broadcast requests.

FIG. 23 is a sequence diagram illustrating a possible sequence of message flows showing a collection device 2202 that scans a network to retrieve information of panels 2203 and connector plugs 2204 within a network that does not support multicasting. When the network does not support multicast addresses, the collection device 2202 may use a broadcast address and a device type parameter to indicate that the broadcast message transmission is intended for a particular device type or a device offering a particular service (such as CPID panel service). For example, the collection device 2202 may broadcast a scan request, with a device type parameter that specifies the message is intended for panels. Panels 2203 receive the message and respond by transmitting a status response. Also, the collection device 2202 may broadcast a scan request, with a device type parameter that specifies the message is intended for connector plugs. Connector plugs 2204 receive the message and responds by transmitting an associated status response. The use of broadcast addresses along with device type parameters may prevent unrelated personal area network devices from responding. In a similar manner to the sequence status responses described above with respect to FIG. 23, the devices transmitting the status responses may implement a random transmission delay before transmitting the response to the scan request.

Figure 24:
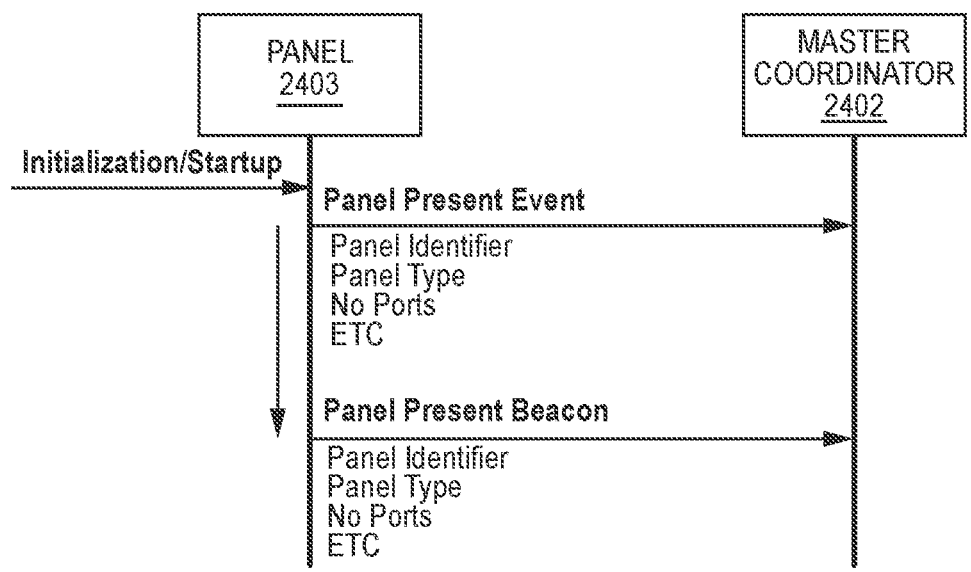
FIG. 24 is a sequence diagram of message flows in an exemplary embodiment for indicating the presence of a panel.

FIG. 24 is a sequence diagram illustrating a possible sequence of message flows for notifying a collection device 2402 when a panel 2403 becomes operational. For example, when a panel 2403 is initialized or starts up, the panel 2403 may transmit a panel present event to the collection device 2402. After a period of time after transmitting the panel present event, a timeout may occur and the panel 2403 may then transmit a panel present beacon. Further, the collection device 2402 may optionally stop the panel from presenting messages or beacons by connection to the panel and retrieving additional data, sending an acknowledgement, or connecting for initial configuration, for example, location setting.

Figure 25:
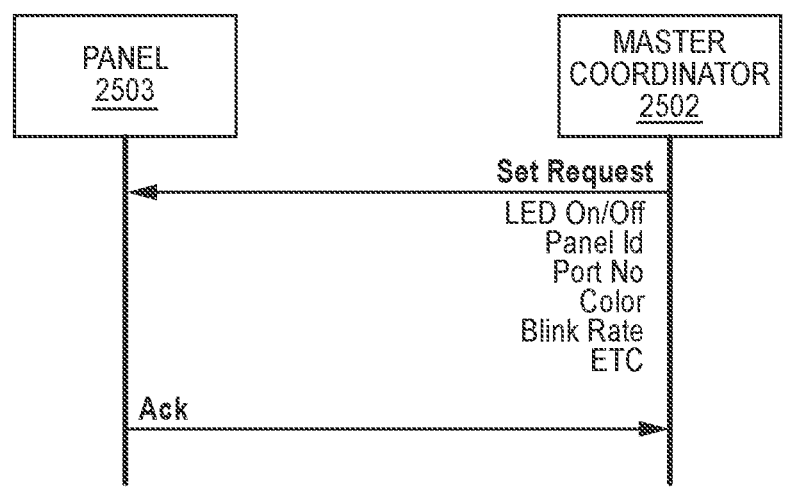
FIG. 25 is a sequence diagram of message flows in an exemplary embodiment for configuring a panel.

FIG. 25 is a sequence diagram illustrating a possible sequence of message flows for setting and/or clearing port LEDs. For example, a collection device 2502 may transmit a set request to the panel 2503. The set request may indicate a port number in the panel and provide instructions to the panel as how to drive the LED of the associated port. The panel 2503 upon receiving the set request may transmit an acknowledgment back to the collection device 2502. The acknowledgement may be sent back to the collection device 2502 to indicate that either the set request has been received by the panel 2503 or the panel has driven the LED as instructed in the set request. Thus, the collection device 2502 may control the driving of the LEDs.

As described above, in FIGS. 18-25, the sequence diagrams show event driven models, where endpoints, such as the panels and connector plugs asynchronously transmit data to the collection device when events occur. In other models, the endpoints may stay silent, except when they are polled (receive a request) from the collection device. In a polled model, once the master has received information about panel IDs and configurations, the collection device may periodically send out messages to each port, where the message includes a port ID and a panel ID to identify the panel and the port. If a connector is present in the port identified by the port ID and the panel ID, the connector in the port may respond with a status message.

In at least one example of a collection device polling the panel may occur when the collection device requests the entire inventory of a panel. When the panel receives an entire inventory request, the panel may respond with data that encompasses the entire inventory of the panel. For example, an inventory may include: panel type, number of ports, port type, location, followed by each port and associated cable information, LED status, or empty. In certain implementations, when there are size restrictions on messages transmitted over the wireless interface, the transmission of the inventory from the panel to the collection device may take several messages from the panel with acknowledgements from the collection device. A request for an entire inventory may be requested at any time.

In certain implementations, after a request for the entire inventory of a panel is sent, the collection device may send subsequent polls requesting any changes that have taken place since the last poll was sent. In order to provide the changes, the panel may only receive a single polling request from the collection device. As stated above, at times the amount of data transmitted in response to the polling request may exceed a size restriction for transmitting data, as such, the message may be divided into more than one message from the panel, where each message may be acknowledged by the collection device. Further, in one implementation, where the message is broken up into multiple segments, each segment may be accompanied with a sequence number to ensure that the collection device can determine that all the requested data was received by the collection device.

In at least one implementation, sequence numbers may be associated with different actions performed at a panel. For example, a panel may have a number of ports and an initial state of the panel may be associated with a sequence number 1. Subsequent actions performed at the panel may cause a panel database to increment the sequence number and associate the new sequence number with the most recent action performed at the panel. When the connection management system receives data for a particular sequence number, the panel transmits data that is associated with the particular sequence number. In one particular example, a panel may have 12 ports, with cables inserted in ports 2 and 8. Further, the LED for port 5 may be green and flashing. The initial configuration where cables are in ports 2 and 8 and the LED for port 5 is flashing may be associated with the sequence number 1 in the panel database. The LED for port 5 may then be turned off and with this action the sequence number for the panel database may be incremented to 2. Next, a cable may be inserted into port 4 and the sequence number may be incremented to 3. A message may be sent from the collection device that requests an update from the panel database associated with the sequence number 3. In response to this request, the panel sends information associated with the insert event at port 4 and may also send port 4 cable information. To get information for the panel, may take several messages associated with the different sequence numbers stored in the panel database. In certain implementations, if the collection device requests information for a sequence number that is greater than any sequence number stored in the panel database, the panel may transmit all the information stored in the panel database. As such, the use of sequence numbers may allow a user to request only a desired portion of the information stored in the panel database as compared to the entire database. In an alternative implementation, a checksum may be used as a sequence number.

In the embodiments described herein, the connector plugs may acquire information from their associated panel ports and transmit data to a collection device, which collection device may be a mobile device or a connection management system. When the collection device is a connection management system, the panels may transmit panel information to the connection management system. With the data received from the connector plugs and the panels, the connection management system may execute control functions that direct the various panels and connector plugs how to operate within the network. As most of the control functionality exists in the connection management system, the panels may be virtualized. Due to this virtualization, the panel control functions execute on general purpose hardware/servers that exist in the connection management system and the panel hardware is abstracted from the physical hardware to create a logical representation of panels, ports, and connectors at the connection management system. This abstraction permits the simplification of the panel hardware, such that it can contain a processor with a network interface such as an interface for a wireless PAN.

In certain implementations, the panels and connector plugs function as hardware with sensors that relay information to the connection management system and respond to commands received from the connection management system. For example, panels may relay start-up events to the connection management system, where the start-up events contain panel identifiers, type of panels, number of ports, etc. For panels that support absolute technologies, the panels may also relay port insertion/removal events and cable data. In embodiments, where the panels support connector plugs with wireless communication interfaces, the connector plugs may relay insertion/removal events, connector plug information, and cable information.

Typically, as the panels, and potentially the connector plugs, have wireless communication interfaces for personal area networks, the panels and connector plugs are unable to communicate directly with the connection management system as the connection management system may communicate with other devices through a TCP/IP communication interface. To provide the desired communications to the connection management system the messages transmitted by the panels and control plugs may be translated for transmission through a TCP/IP stack. In particular, the translation for communication through the TCP/IP stack may be performed because the connection management system may be located at a position that is out of range of the transmissions by the panel and the connector plugs. To provide the translation a mobile device may be located at a position within range of the wireless transmissions from the panels and connector plugs. The mobile device receives messages that are transmissions from the panels and connector plugs and then translates the received messages into a TCP/IP format for transmission to the connection management system.

Figure 26:
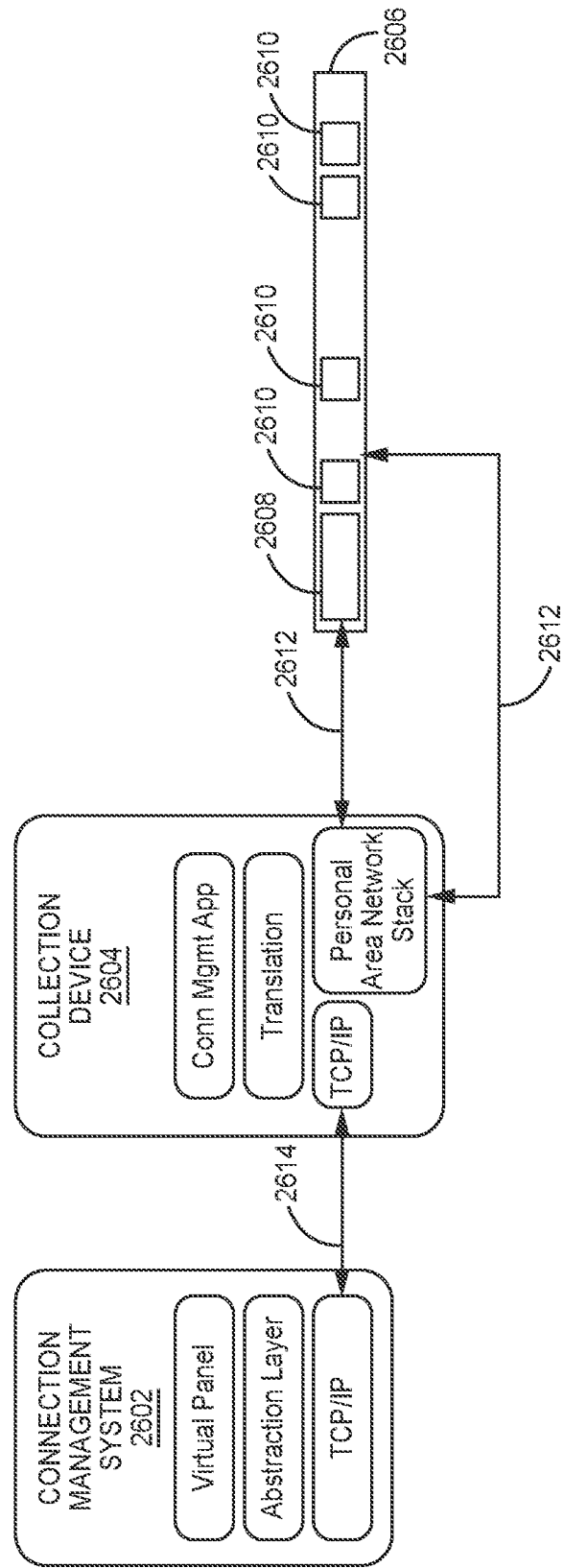
FIG. 26 is a block diagram of an exemplary embodiment for providing virtualization of a panel.

FIG. 26 illustrates the communication of messages from a panel 2606 and connector plugs 2610 to a connection management system 2602. As illustrated, the panel 2606 includes a panel processor 2608 and multiple ports. Connector plugs 2610 may be inserted into the ports of the panel 2606. The panel processor 2608 and potentially the connector plugs 2610 include wireless communication interfaces that are configured to communicate through personal area networks 2612. However, the connection management system 2602 may be too far away to receive the transmissions of the panel processor 2608 and the connector plugs 2610 through the personal area networks 2612. However, a collection device 2604 or other device may be in the proximity of the personal area networks 2612. The collection device 2604 may include a personal area network stack for receiving the transmissions from the panel processor 2608 and the connector plugs 2610. In exemplary implementations, the collection device 2604 may include connection management functionality. The collection device 2604 may also include translation functionality for translating messages received through the personal area network stack into formats for transmissions through a TCP/IP network 2614. The collection device 2604 may transmit the translated messages to the connection management system 2602 through the TCP/IP network 2614. Conversely, the connection management system may transmit messages for the panel processor 2608 and the connector plugs 2610 to the collection device 2604 for translation into formats for transmission over the personal area networks 2612 to the panel processor 2608 and the connector plugs 2610.

As the control of the panel 2606 is abstracted from the panel 2606, the connection management system 2602, virtual panels may be created at the connection management system 2602, where the virtual panels have configurations that could be potentially different from the physical hardware that is actually on the panel 2606. For example, if the panel 2606 has 48 ports, the 48 ports may be segmented such that the panel 2606 is presented by the connection management system 2602 as two separate panels having 24 ports each. Conversely, two separate panels having 24 ports each may be presented as a single panel having 48 ports. Also, non-standard panel sizes may be presented. Further, event and error buffers may also be part of the virtual panels.

In certain implementations, when a panel is first installed in a managed connectivity system, the panel may send identifying information for the panel to the connection management system, where the panel identification information may be associated with a specific location by the connection management system. For example, the connection management system may store in memory the panels that are associated with a specific location.

In at least one implementation, panels may be connected to a local master device, which may, in turn, be connected to a centralized connection management system. Some panel installations may use more than one local master device/management system for efficient use of personal area network system capacity and range. In this case, groups of panels may be organized into distinct personal area networks that are managed by specific local masters.

Figure 27:
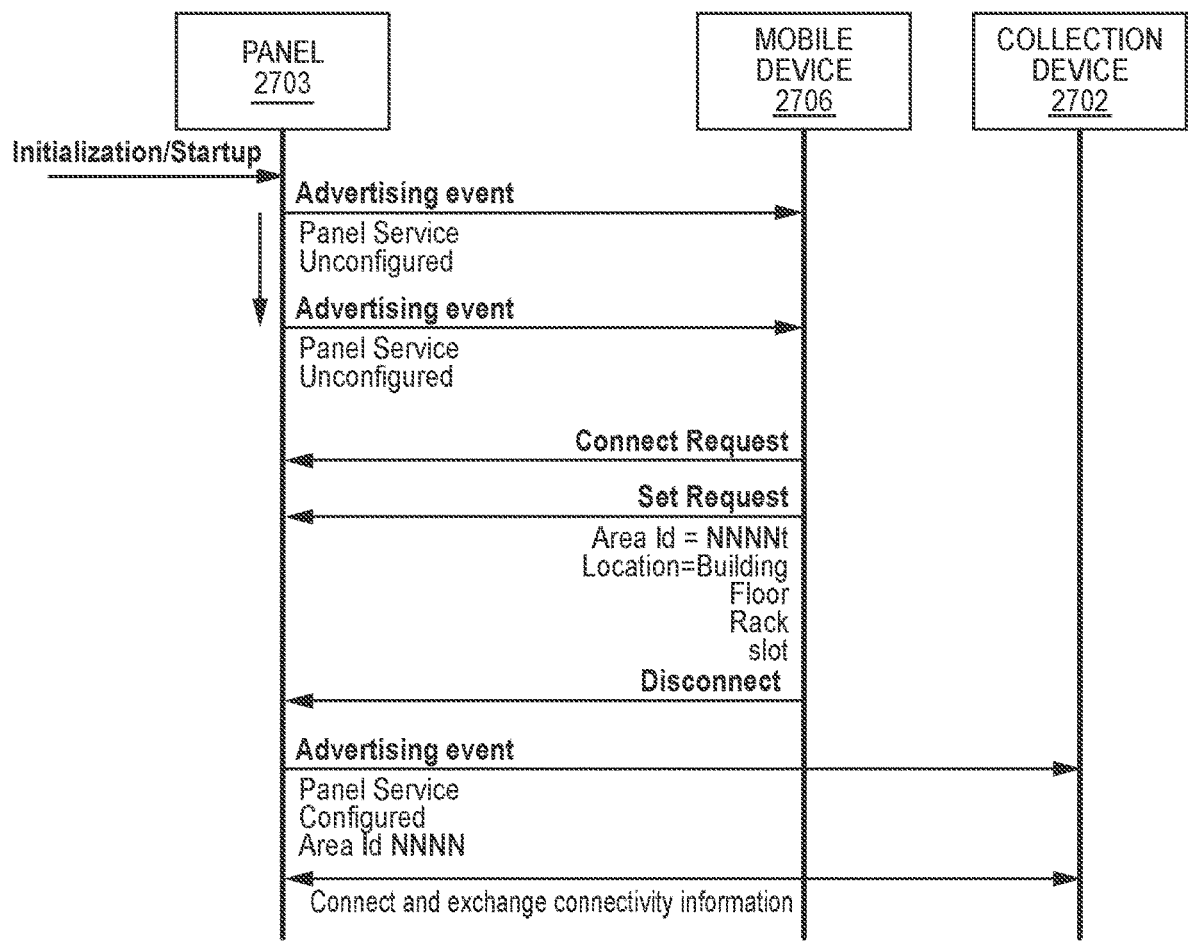
FIG. 27 is a sequence diagram of message flows in an exemplary embodiment for associating a panel with a particular area in a network.

FIG. 27 is a sequence diagram illustrating one implementation for the installation of a panel 2703. In at least one example, when a panel 2703 is installed, the panel 2703 may power up in an unconfigured state. The panel 2703 may send out periodic advertisements indicating support for panel service and that the panel is not yet configured. A local collection device 2702 for the area may typically ignore advertisements from unconfigured panels. In some implementations, a technician, such as the technician who installed the panel or other technician, may use a local mobile device 2706 and connect to the panel using a configuration app. In an optional implementation, the configuration functionality may also reside on a local collection device 2702.

In certain implementations, once the mobile device being used by the technician is connected to the new panel, the configuration application on the mobile device may configure the location of the panel. The panel location may be defined by a combination of building, floor, rack, and slot. Other characteristics and combinations may also be used to describe the location of the panel. To encode the location, the elements describing the building, floor, rack, and slot may have numerical and text equivalents. Once the configuration is complete, the panel may start advertising configured panel service, and may connect with the local collection device 2702.

In certain exemplary implementations for configuring the panel, the mobile device 2706 may receive the advertisement from the panel 2703 and may initiate a connection by sending a connect request. The initiation of the connection by the mobile device 2706 may stop the panel 2703 from sending further advertisements to the mobile device 2706. The mobile device 2706 may then send a command to set the location, and optionally an Area ID for the location of the panel 2703. The mobile device 2706 may then close the connection, which causes the panel 2703 to start advertising again, as a configured device. When the panel 2703 recommences sending advertising events, the mobile device 2706 may recognize the panel service as being configured, and may connect with the panel as needed. As the panel 2703 is advertising location information, both the mobile device 2706 and the collection device 2702 may now automatically have location information for the panel 2703.

In certain exemplary implementations, where cable connector plugs have a personal area network interface, a system may operate without providing an initial configuration for the cable connector plug. In at least the example, where the cable connector plugs have a personal area network interface, the cable has the panel id information available for the panel where the cable connector plug is inserted. This can then be used to determine location by the management system using the panel's location.

In at least one exemplary embodiment, panels may be optionally grouped into multiple distinct personal area networks, each with its own local management system that connects back to a centralized connection management system. The installer may have the ability to individually customize which panels are allocated to which personal area network.

Figure 28:
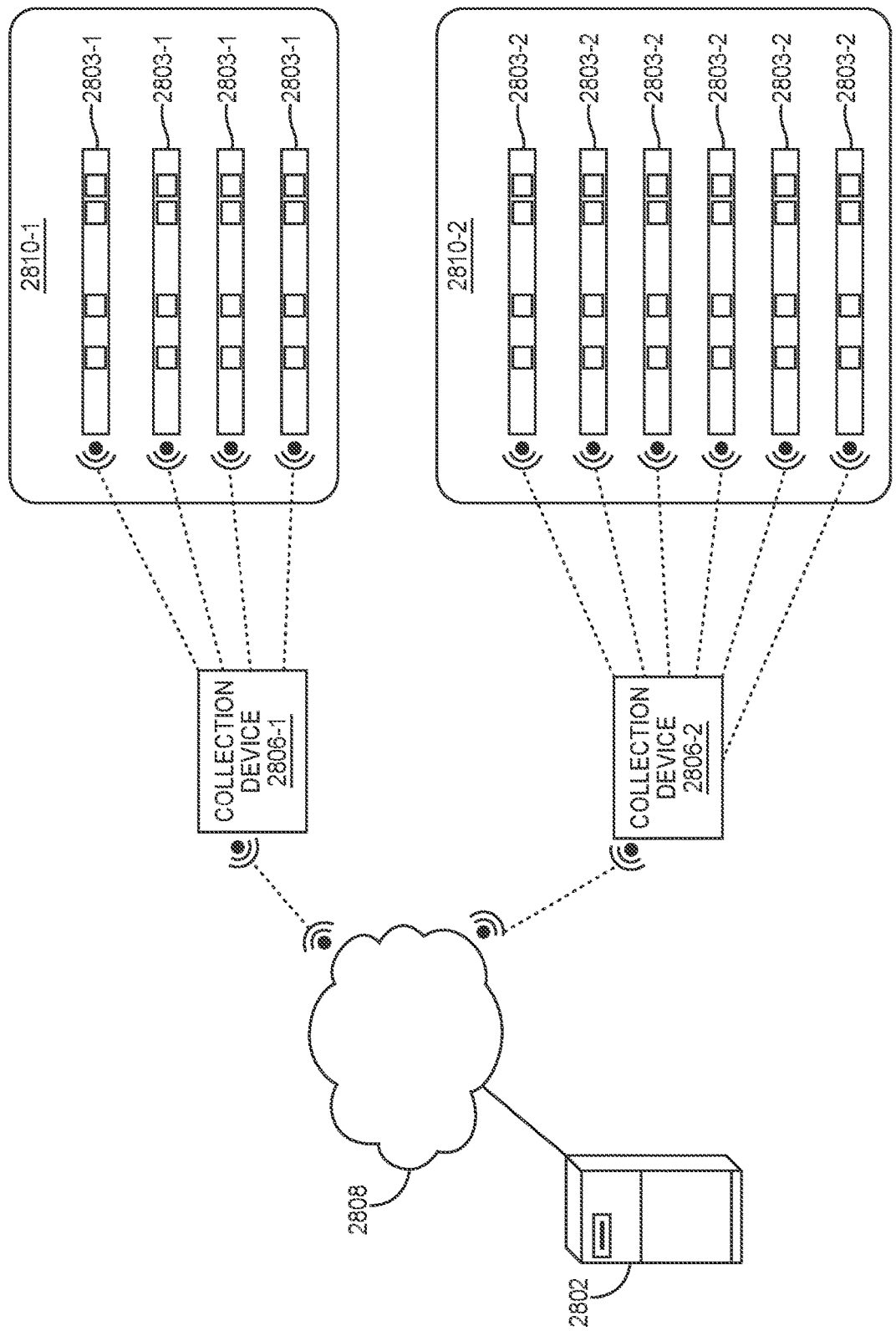
FIG. 28 is a block diagram illustrating the association of panels with different areas in a network.

For example, FIG. 28 is a block diagram illustrating panels 2803-1 and 2803-2 that are grouped into different personal area networks. To group the different panels 2803-1 and 2803-2 into different personal area networks, the panels may be configured with an area identifier when the panel is first configured as described above with respect to FIG. 27, as shown above. In certain implementations, the area identifier may be an integer number, however other schemes for creating the area identifier may be chosen. As illustrated, panels with the same area identifier are part of the same personal area network. For example, the panels identified by 2803-1 may be configured to have an area identifier associated with a personal area network 2810-1 and the panels identified by 2803-2 may be configured to have an area identifier associated with a personal area network 2810-2. After configuration, the panels 2803-1 and 2803-2 may advertise the panel service along with the area ID that identifies the personal area network to which the panels 2803-1 and 2803-2 belong. An additional option may include, at configuration time when a panel is configured with an area id, the panel may also be configured with an advertising channel(s) at a specific frequency, where the number of channels may be limited due to a finite number of channels. Accordingly, separate areas may also be separated into different advertising channels, which may improve performance. Local masters such as collection devices 2806-1 and 2806-2 may also be configured with an area identifier and also, may connect to panels with the same area identifier, while ignoring panels with a different area identifier. Both collection devices 2806-1 and 2806-2 may communicate through network 2808 with a connection management system 2802. For example, collection device 2806-1 may communicate with panels 2803-1 in the personal area network 2810-1 because the collection device 2806-1 and the panels 2803-1 have the same area identifiers. The collection device 2806-1 may not communicate with the panels 2803-2 because they have a different area identifier. Similarly, collection device 2806-2 may communicate with panels 2803-2 in the personal area network 2810-2 because the collection device 2806-2 and the panels 2803-2 have the same area identifiers. The collection device 2806-2 may not communicate with the panels 2803-1 because they have a different area identifier. When area identifiers are not present, a collection device or local master may connect to all panels. Further, when connector plugs have a wireless communication interface, the connector plugs may not be configured with an area identifier. The connection management system 2802 may group the connector plugs based on the area ID associated with the panel into which the connector plugs are inserted.

Further, at the time of initialization, a collection device 2806 may collect signal and other device information for devices that are visible and then send it to a central management system, or process the information directly when the central management system functions as the collection device. The gathered information may include information such as-signal strength, error rate, delay, and device information. The central management system may then use the information to pair local collection devices with the devices or the panels associated with the panels.

Figure 29:
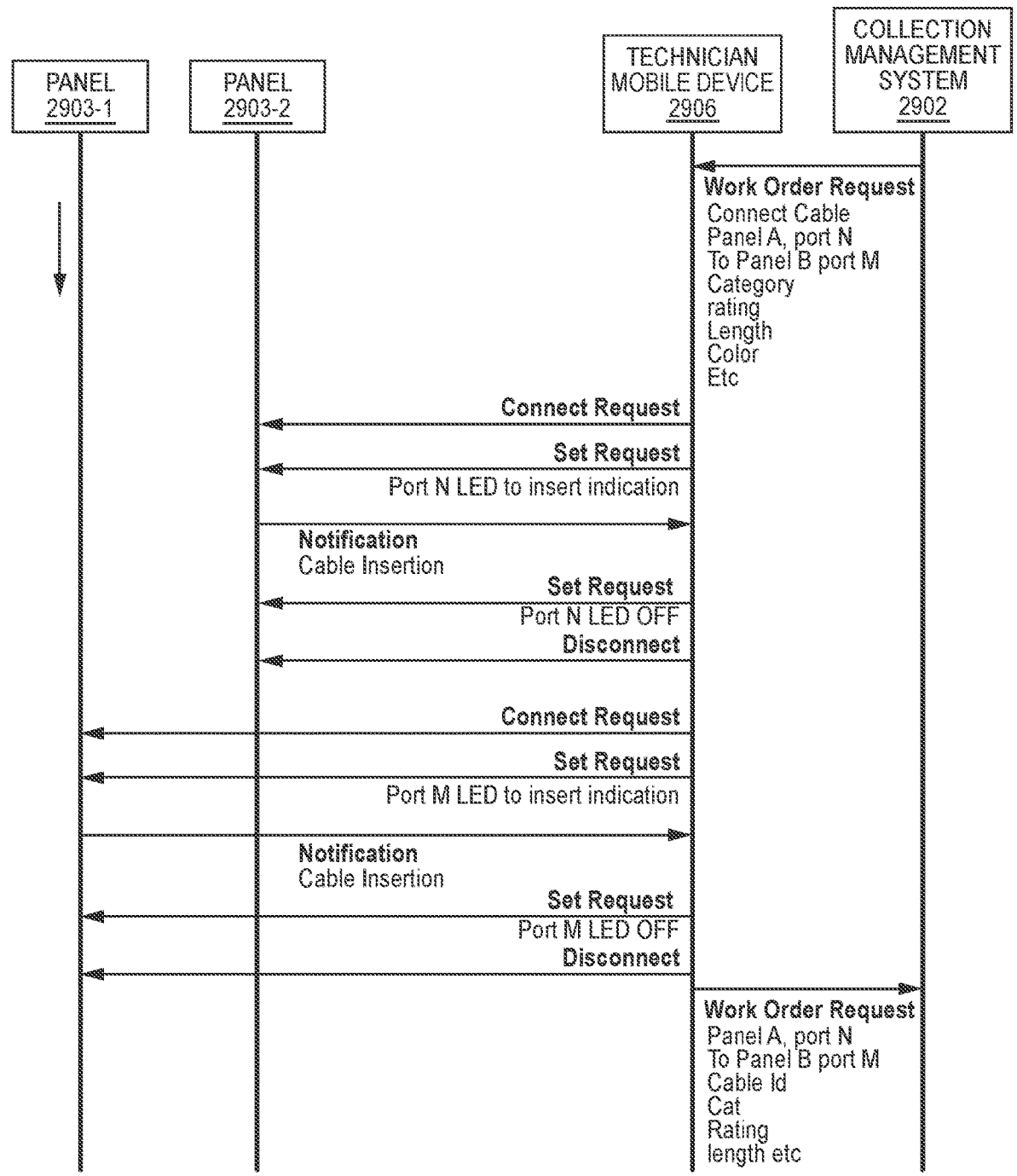
FIG. 29 is a sequence diagram of message flows in an exemplary embodiment for completing work orders.

FIG. 29 is a sequence diagram illustrating a series of messages for handling work orders within a network. As used herein, a work order may be a direction to a technician to perform a particular service on the network. For example, a work order may be a series of instructions for a technician to install or remove cables. A connection management system 2902 may create a work order to be downloaded by a technician onto a device for execution, such as technician's mobile device 2906. This may allow work orders to be carried out independently of local master devices so that loading may be reduced on the local master. Also, this allows the technician to be physically beside the equipment that is the subject of the work order.

To perform the work order, the work order may be downloaded to the technician mobile device 2906. The technician mobile device 2906 may then issue a connect request to panel 2903-2. The connect request allows the panel 2903-2 to set port LEDs on the panel. After the connect request, the technician mobile device 2906 may send a set request identifying a particular port in the panel 2903-2. Upon the reception of the set request, the panel 2903-2 may begin driving the LED associated with the identified port in a manner different from the other LEDs (i.e. flashing the LED) in the panel to guide the insertion or removal of a connector plug from the port identified in the set request. The technician may then insert or remove the connector plug that is the subject of the work order.

In at least one exemplary implementation, when a connector plug is inserted, the panel 2903-2 may send a notification to the technician mobile device 2908 that indicates that a cable has been inserted. In at least one example, the notification may also identify cable characteristics. If the information notification indicates that the correct cable was inserted, the technician mobile device 2902 may send a set request that directs the panel 2903-2 to turn the port LED off. In at least one alternative embodiment, the technician mobile device may direct the panel 2903-2 to drive the port LED in a particular fashion before turning off. When the LED is turned off, the technician mobile device 2906 may close the connection with the panel 2903-2. If the cable characteristics of the insertion notification do not match the cable characteristics of the work order the mobile device will display the error and the mismatch and send a message to set the port LED to an error indication. Further, in certain implementations, removal of the cable may generate a disconnection event which will cause the mobile device to reassert the original LED insertion indicator.

In certain implementations, a single work order may describe where to connect both ends of the same cable. In other implementations, a work order may describe where to connect multiple cables in a circuit. In certain embodiments, when the technician mobile device 2906 receives another work order for a inserting a connector plug into a different panel 2903-1, the process described above with respect to the insertion of the connector plug into a port on the panel 2903-2 may be repeated or a process similar thereto may be performed. When the connector plug is successfully inserted into the correct port in the panel 2903-1, the work order may be complete. When a work order is completed, the technician mobile device 2906 may then send a work order complete message to the connection management system 2902.

In at least one example, when a work order is being carried out, the technician mobile device 2906 may optionally send cable insertion events to the connection management system 2906, as the connector plugs are inserted into the ports. Further, when a connector plug is inserted into an incorrect port, the panel may drive an LED associated with the incorrect port to indicate that the wrong connector plug has been inserted. In systems where the connector plugs have wireless communication interfaces, the technician mobile device 2906 may receive the insertion indication from the connector plugs instead of from the panel into which the connector plug is inserted.

FIGS. 30A-31C illustrate implementations, where the connector plug has a switch located on the connector plug. When the switch is turned on, either by pressing it down in the event the switch is a button or by toggling the switch, the connector plug associated with the switch may be identified at the collection device, connection management system, or a mobile device. Further, the connector plugs may also have LEDs located on the connector plug such that when a particular connector plug is selected at the collection device, connection management system, or mobile device, the LED associated with the particular connector plug will become illuminated.

Figure 30A:
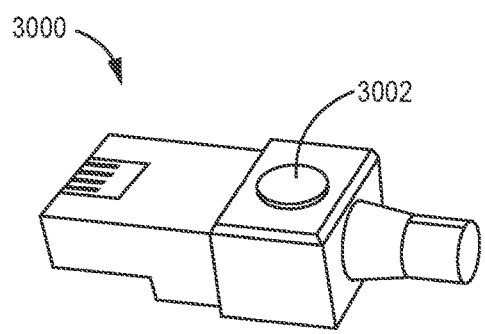
FIGS. 30A-30C are diagrams illustrating an exemplary embodiment for a connector plug with an LED and switch.
Figure 30B:
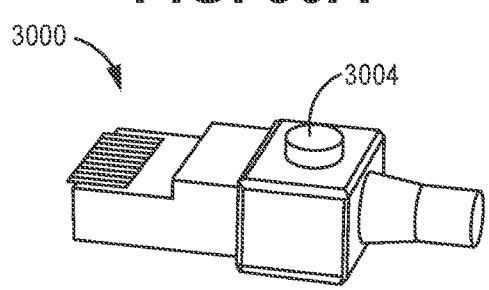
Figure 30C:
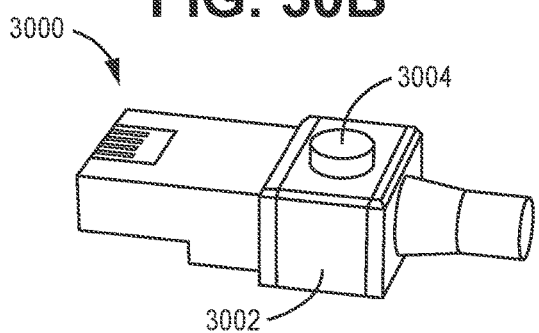

In certain implementations, FIGS. 30A-30C illustrate the implementation where a wire connector plug 3000 includes an LED 3002 and a switch 3004. As shown in FIG. 30A, the connector plug 3000 may include an LED 3002 located on a surface of the connector plug 3000. When a user selects the connector plug through a human machine interface on one of the collection device, the connection management system, or a mobile device the LED 3002 may be illuminated on the connector plug 3000 to aid the user in finding the desired connector plug. For example, a microcontroller on the connector plug 3000 may receive a command from the collection device through a wireless interface on the connector plug to illuminate the LED 3002. Alternatively, the collection device may send the command to a panel, where the panel directs the LED 3002 to be illuminated.

FIG. 30B illustrates an implementation of an exemplary opposite side to the connector plug 3000 shown in FIG. 30A. As illustrated in FIG. 30B, the connector plug 3000 includes a switch 3004, that when turned on, causes the microcontroller on the connector plug 3000 to send a signal through the wireless interface to a collection device such that information associated with the connector plug is identified on one or more of the collection device, connection management system, or mobile device. The switch 3004 is illustrated as a button that is turned on when the button is depressed. Alternatively, the switch 3004 may be any other device capable of being activated by a user such that a signal is sent to the collection device. FIG. 30C illustrates an alternative implementation, where the LED is a slice of the plug, such that it can be viewed from any side of the plug.

Figure 31A:
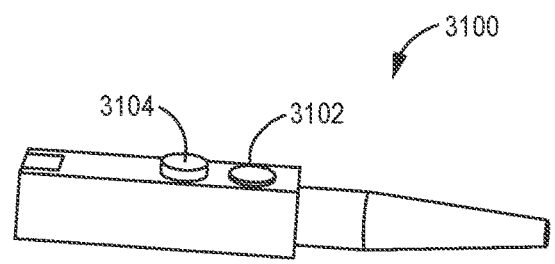
FIGS. 31A-31C are diagrams illustrating an exemplary embodiment for a connector plug with an LED and switch.
Figure 31B:
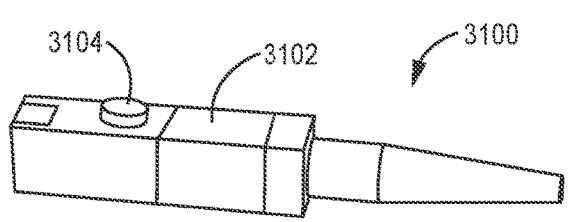
Figure 31C:
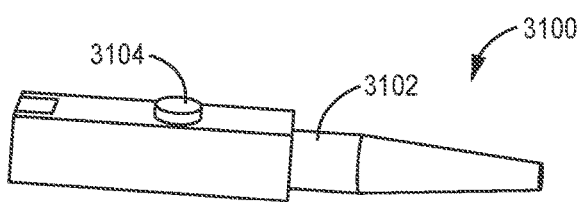

FIGS. 31A-31C are similar to FIGS. 30A-30C in that they illustrate a connector plug 3100 having an LED 3102 and a switch 3104. However, connector plug 3100 differs from connector plug 3000 in FIGS. 30A-30C in that connector plug 3100 is a fiber optic connector plug. FIG. 31A illustrates a connector plug 3100 where the LED 3102 and the switch 3104 are located on a single side of the connector plug 3100. In contrast to FIG. 31A, FIGS. 31B and 31C illustrate different embodiments where the LED 3102 is a slice of the connector plug and visible from all sides of the connector plug.

Figure 32:
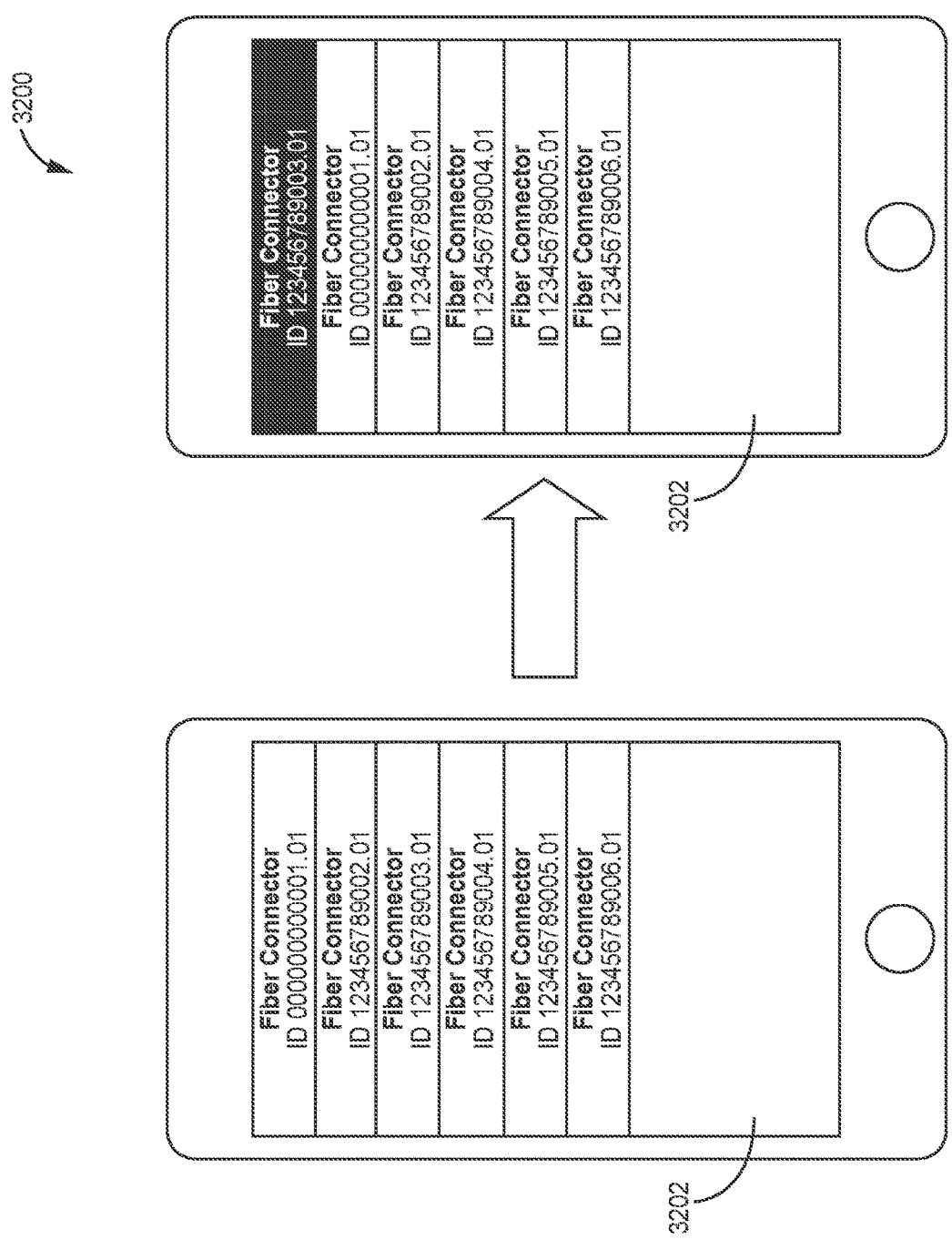
FIG. 32 is a diagram illustrating an exemplary embodiment of a mobile device showing a human machine interface.

As illustrated in FIG. 32, a mobile device 3200 illustrates a human machine interface 3202. The human machine interface 3202 displays multiple user selectable fields where each field is associated with a different connector plug in a network that implements managed connectivity. When a user selects one of the fields, in the human machine interface, an LED on the connector plug associated with the user selectable field may become illuminated. For example, as illustrated, a user may select the user selectable field associated with the connector plug with ID number 123456789003.01. When the user selects the field, the LED on the connector plug associated with ID number 1234456789003.01 will be illuminated.

Figure 33:
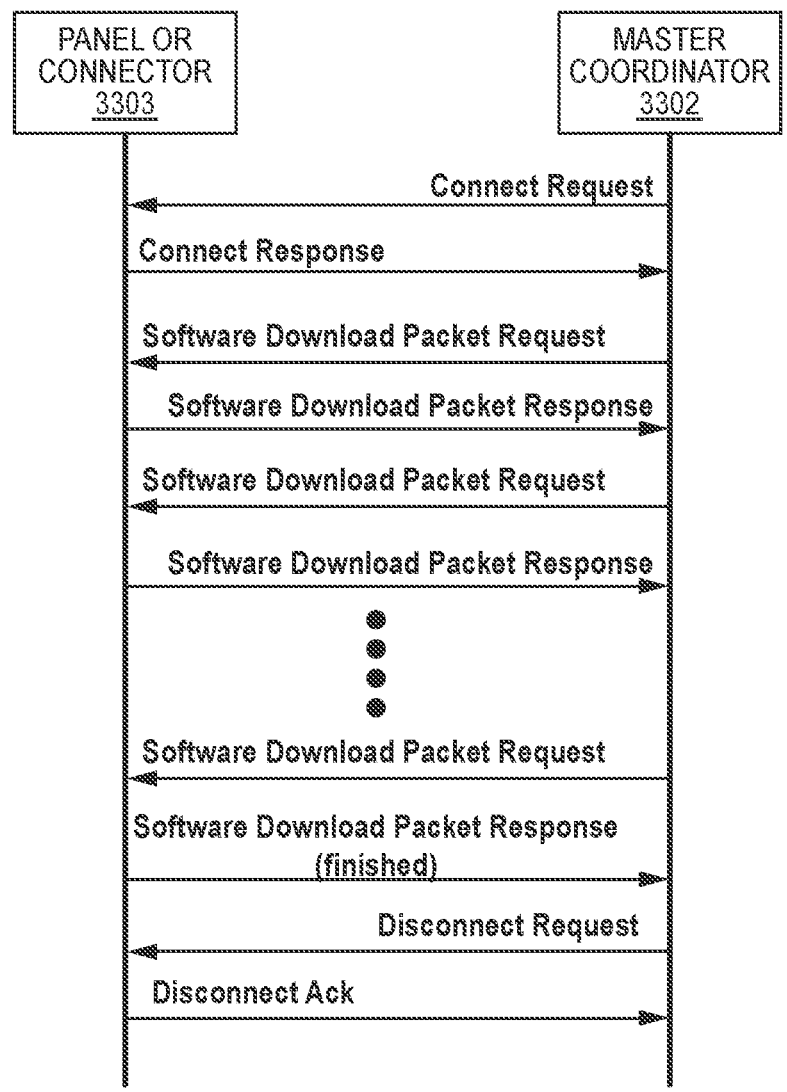
FIG. 33 is a sequence diagram of message flows in an exemplary embodiment for updating a panel or connector plug.

FIG. 33 illustrates the communications between a panel/connector plug 3303 and a master coordinator 3302, where the panel/connector plug 3303 receives a software update from the master coordinator 3302. In certain implementations, a panel/connector plug 3303 may receive a software update from a master/coordinator 3302 through an over the air transmission. Accordingly, software installed on managed connectivity devices (such as the panel/connector plug 3303) may be controlled and upgraded by the master/coordinator 3302.

In certain implementations, the software download may be initiated by the master/coordinator 3302. As illustrated in the sequence diagram, the downloading of software may be performed in three separate phases. The three phases may be described as the establishment of a connection between the panel/connector plug 3303 and the master/coordinator 3302, communication of the software image, and release of the connection between the panel/connector plug 3303 and the master/coordinator 3302. As illustrated, during the establishment of the connection between the panel/connector plug 3303 and the master/coordinator 3302, the connection may be initiated by the master/coordinator 3302. For example, the master/coordinator 3302 may send a connect request to the panel/connector plug 3303, whereupon reception of the connect request, the panel/connector plug 3303 may respond with a connect response to complete the establishment of the connection between the master/coordinator 3302 and the panel/connector plug 3303. In certain implementations, the establishment of a connection may establish a one-to-one dedicated connection on an unused channel, such that contention with other devices that communicate on other channels is reduced.

When the connection is established, the master/coordinator 3302 may begin transmitting the software image to the panel/connector plug 3303. In at least one implementation, the software image to be downloaded by the panel/connector plug 3303 may be broken up by the master/coordinator 3302 into smaller records that can fit into a maximum packet size as dictated by the communication standard or communication equipment used for communication. The master/coordinator 3302 may then sequentially transmit the smaller records to the panel/connector plug 3303. When a transmitted record is received by the panel/connector plug 3303, the panel/connector plug 3303 may transmit an acknowledgement that the record was received to the master/coordinator 3302. Sequence number may be used to detect lost transmission. If the master/coordinator 3302 fails to receive an appropriate acknowledgement for the latest sequence number, the master/coordinator 3302 may retransmit the record associated with the latest sequence number. In certain implementations, a more data flag may be included as part of the transmissions from the master. When the more data flag is set, the panel/connector plug 3303 interprets the more data flag as an indication that more packets are to be transmitted from the master/coordinator 3302 as part of the software image. When the more data flag is not set, the panel/connector plug 3303 interprets the non-set more data flag as indicating that the currently received data packet is the last fragment of the software download image. After acknowledgement of the last fragment by the panel/connector plug 3303, the master/coordinator 3302 may close the connection with the panel/connector plug 3303. Frequently, the downloaded image may also contain a checksum that the slave may use to check the integrity of the software image.

Exemplary Embodiments

Example 1 includes a system for providing connectivity management, the system comprising: a connection management system configured to manage connectivity for a network; a collection device configured to collect connectivity information for at least a portion of the network for use by the connection management system; a panel having a plurality of ports for receiving connector plugs; and at least one connector plug inserted into at least one port in the plurality of ports, wherein the connectivity information is communicated from the panel and the at least one connector plug to the collection device through one or more wireless communication interfaces.

Example 2 includes the system of Example 1, wherein the one or more wireless communication interfaces are at least one of: a Bluetooth network interface; and an IEEE Example 802. Example 15.4 network interface.

Example 3 includes the system of any of Examples 1-2, wherein a port in the plurality of ports comprises: a memory device configured to store information describing the port; contacts for connecting to a connector plug in the at least one connector plugs; a port LED, wherein the port LED is driven by a panel processing unit.

Example 4 includes the system of Example 3, wherein the panel processing unit drives the port LED as instructed by the connection management system.

Example 5 includes the system of any of Examples 1-4, wherein the panel comprises a panel microcontroller, the panel microcontroller comprising: a memory that stores connectivity information about the panel; and a system on chip comprising a panel processing unit and a panel wireless communication interface in the one or more wireless communication interfaces.

Example 6 includes the system of Example 5, wherein the panel processing unit communicates with the connection management system through the panel wireless communication interface.

Example 7 includes the system of any of Examples 5-6, wherein the panel processing unit is coupled to a plurality of port processing units, wherein each port processing unit in the plurality of port processing units is associated with a port in the plurality of ports.

Example 8 includes the system of any of Examples 5-7, wherein the panel processing unit receives connectivity information from the at least one connector plug, wherein the panel processing unit transmits the connectivity information to the collection device through the panel wireless communication interface.

Example 9 includes the system of any of Examples 5-8, wherein the panel microcontroller further comprises an energy storage device and a power staggering control, wherein the power staggering control regulates the use of power by the ports and connector plugs in the event of a power event experienced by the panel, such that different ports in the plurality of ports experience the power event at different times.

Example 10 includes the system of any of Examples 5-9, wherein the panel microcontroller receives a software update from the connection management system through the panel wireless communication interface.

Example 11 includes the system of Example 10, wherein the software update is received as multiple smaller records in multiple transmissions over the wireless communication interface.

Example 12 includes the system of Example 11, wherein each of the multiple smaller records is identified by a sequence number.

Example 13 includes the system of any of Examples 1-12, further comprising a power adapter that provides power to the panel.

Example 14 includes the system of Example 13, wherein the panel is a master panel that receives power from the power adapter and provides power to one or more general panels.

Example 15 includes the system of any of Examples 13-14, wherein the panel indicates that it is present to the connection management system upon reception of the power from the power adapter.

Example 16 includes the system of any of Examples 1-15, wherein a connector plug in the at least one connector plug comprises: contacts for connecting to a port in the plurality of ports; a system on chip, the system on chip comprising a processing unit and a wireless communication interface in the one or more wireless communication interfaces; an energy storage device.

Example 17 includes the system of Example 16, wherein the processing unit checks that the port has a memory device, wherein the processing unit transmits the connectivity information to the connection management system when the port has a memory device and the processing unit provides the connectivity information to the port when the port does not have a memory device.

Example 18 includes the system of any of Examples 16-17, wherein the energy storage device receives power from the port.

Example 19 includes the system of Example 18, wherein the connector plug transmits an insert event to the collection device upon reception of the power from the port.

Example 20 includes the system of Example 19, wherein the connector plug transmits a connector present beacon to the collection device after a timeout period expires after the transmission of the insert event.

Example 21 includes the system of any of Examples 18-20, wherein the connector plug transmits a removal event upon loss of the power from the port.

Example 22 includes the system of any of Examples 18-21, wherein the connector plug transmits a connector disconnect beacon to the collection device after a timeout period expires after the transmission of the removal event.

Example 23 includes the system of any of Examples 16-22, wherein the energy storage device provides power to the system on chip for transmitting messages after the connector plug is disconnected from the port.

Example 24 includes the system of any of Examples 1-23, wherein the panel and at least one connector plug provide connectivity information in response to a request from the connection management system.

Example 25 includes the system of any of Examples 1-24, wherein the panel and at least one connector plug are configured based on a configuration instruction received from the connection management system.

Example 26 includes the system of any of Examples 1-25, wherein a transmission through the one or more wireless communication interfaces has a unique address that identifies one of the panel and the plurality of connector plugs that produced the transmission.

Example 27 includes the system of Example 26, wherein the unique address is at least one of: an IEEE 802 MAC address; a randomly generated link layer address; and an address derived from identifiers for at least one of the panel, the plurality of ports, and the plurality of connector plugs.

Example 28 includes the system of any of Examples 26-27, wherein collision resolution is performed when the unique address for the transmission produced by one of the panel and the at least one connector plug is the same as an address for another transmission produced by another device in a wireless network.

Example 29 includes the system of any of Examples 1-28, wherein the collection is at least one of: a server; a mobile device; a part of the connection management system.

Example 30 includes the system of any of Examples 1-29, wherein the collection device comprises: a collection wireless communication interface for receiving the connectivity information that is transmitted through the one or more wireless communication interfaces; a collection network interface; and a processing unit configured to translate the connectivity information from a first format for transmission through the one or more wireless communication interfaces to a second format for transmission through the collection network interface, wherein the connectivity information is transmitted to the connection management system through the collection network interface.

Example 31 includes the system of any of Examples 1-30, wherein the collection device receives connectivity information from a plurality of panels, wherein the panel is in the plurality of panels.

Example 32 includes the system of Example 31, wherein the collection device is a local master device for an area and the plurality of panels are located in the area.

Example 33 includes the system of any of Examples 1-32, wherein the collection device receives connectivity information from a second collection device.

Example 34 includes the system of any of Examples 1-33, wherein the at least one connector plug comprises an LED, wherein the LED is illuminated as directed by the connection management system.

Example 35 includes the system of Example 34, wherein the connection management system directs the LED to be illuminated when a user selects a reference to the at least one connector plug on a human machine interface.

Example 36 includes the system of any of Examples 34-35, wherein the LED is visible from all sides of the connector plug when the LED is illuminated.

Example 37 includes the system of any of Examples 1-36, wherein the at least one connector plug comprises a switch that directs the connection management system to provide a user with identifying information for the at least one connector plug when the switch is turned on.

Example 38 includes the system of any of Examples 1-37, wherein the connector plug receives a software update from the connection management system through the wireless communication interface.

Example 39 includes the system of Example 38, wherein the software update is received as multiple smaller records in multiple transmissions over the wireless communication interface.

Example 40 includes the system of Example 39, wherein each of the multiple smaller records is identified by a sequence number.

Example 41 includes a collection device, the collection device comprising: a processing unit configured to execute instructions stored thereon; a wireless communication interface through which the mobile device communicates connectivity information with at least one panel; and wherein the processing unit translates messages from a connection management system for transmission through the wireless communication interface and translates messages received through the wireless communication interface for use by the connection management system.

Example 42 includes the collection device of Example 41, wherein the collection device is at least one of: a server; a mobile device; and a part of the connection management system.

Example 43 includes the collection device of any of Examples 41-42, wherein the collection device receives connectivity information for a particular location identified by an area identification.

Example 44 includes the collection device of Example 43, wherein the at least one panel in communication with the collection device is identified by the area identification.

Example 45 includes the collection device of any of Examples 41-44, wherein the collection device receives connectivity information from at least one other collection device.

Example 46 includes the collection device of Example 45, wherein the collection device communicates through the wireless communication interface with the at least one other collection device.

Example 47 includes the collection device of any of Examples 41-46, wherein the collection device communicates with the connection management system through an IP network.

Example 48 includes a connector plug, the connector plug comprising: at least one contact for interfacing with a panel port; and a system on chip, the system on chip comprising: a processing unit configured to execute instructions stored thereon; and a wireless communication interface, wherein the processing unit transmits connectivity information to a collection device through the wireless communication interface.

Example 49 includes the connector plug of Example 48, wherein the processing unit checks that the panel port has a memory device, wherein the processing unit provides the connectivity information to the port when the port does not have a memory device.

Example 50 includes the connector plug of any of Examples 48-49, further comprising an energy storage device.

Example 51 includes the connector plug of Example 50, wherein the energy storage device receives power from the panel port.

Example 52 includes the connector plug of Example 51, wherein the connector plug transmits an insert event to the collection device upon reception of the power from the port.

Example 53 includes the connector plug of Example 52, wherein the connector plug transmits a connector present beacon to the collection device after a timeout period expires after the transmission of the insert event.

Example 54 includes the connector plug of any of Examples 51-53, wherein the connector plug transmits a removal event upon loss of the power from the port to the collection device.

Example 55 includes the connector plug of Example 54, wherein the connector plug transmits a connector disconnect beacon to the collection device after a timeout period expires after the transmission of the removal event.

Example 56 includes the connector plug of any of Examples 51-55, wherein the processing unit is configured to determine whether loss of the power from the port is caused by a power event or a disconnection of the connector plug from the port.

Example 57 includes the connector plug of any of Examples 50-56, wherein the energy storage device provides power to the system on chip for transmitting messages after the connector plug is disconnected from the panel port.

Example 58 includes the connector plug of any of Examples 48-57, wherein the connector plug provide connectivity information in response to a request from the collection device.

Example 59 includes the connector plug of any of Examples 48-58, wherein the connector plug is configured based on a configuration instruction received from the collection device.

Example 60 includes the connector plug of any of Examples 48-59, further comprising an LED, wherein the LED is illuminated as directed by a received command.

Example 61 includes the connector plug of Example 60, wherein the LED is visible from all sides of the connector plug when the LED is illuminated.

Example 62 includes the connector plug of Example 45, wherein the at least one connector plug comprises a switch, wherein the processing unit transmits an indication through the wireless interface when the switch is turned on.

Example 63 includes a panel, the panel comprising: a plurality of ports configured to receive a plurality of connector plugs; a processing unit configured to execute instructions thereon; and a wireless communication interface, wherein the processing unit communicates connectivity information with a collection device through the wireless communication interface.

Example 64 includes the panel of Example 63, wherein a port in the plurality of ports comprises: a memory device configured to store information describing the port; contacts for connecting to a connector plug in the at least one connector plugs; a port LED, wherein the port LED is driven by a panel processing unit.

Example 65 includes the panel of Example 64, wherein the processing unit drives the port LED as instructed by commands received from the collection device.

Example 66 includes the panel of Example 64, wherein the panel further comprises a memory that stores connectivity information about the panel.

Example 67 includes the panel of Example 63, wherein the panel processing unit is coupled to a plurality of port processing units, wherein each port processing unit in the plurality of port processing units is associated with a port in the plurality of ports.

Example 68 includes the panel of Example 63, wherein the processing unit receives plug connectivity information from at least one connector plug, wherein the processing unit transmits the plug connectivity information to the collection device through the panel wireless communication interface.

Example 69 includes the panel of Example 63, further comprising an energy storage device and a power staggering control, wherein the power staggering control regulates the use of power by the ports and connector plugs in the event of a power event experienced by the panel, such that different ports in the plurality of ports experience the power event at different times.

Example 70 includes the panel of Example 63, wherein the panel receives power from a power adapter.

Example 71 includes the panel of Example 70, wherein the panel is a master panel that receives the power from the power adapter and powers to one or more general panels.

Example 72 includes the panel of Example 70, wherein the panel indicates that it is present to the connection management system upon reception of the power from the power adapter.

Example 73 includes a panel, the panel comprising: a processing unit configured to execute instructions thereon; a wireless communication interface, wherein the processing unit communicates connectivity information about the panel with a collection device through the wireless communication interface; and a plurality of ports, wherein the plurality of ports are configured to communicate connectivity information to the collection device through one or more connector plugs connected to one or more ports in the plurality of ports.

Example 74 includes the panel of Example 73, wherein a port in the plurality of ports comprises: a memory device configured to store information describing the port; contacts for connecting to a connector plug in the at least one connector plugs; a port LED, wherein the port LED is driven by the processing unit.

Example 75 includes the panel of Example 73, wherein the processing unit drives the port LED as instructed by commands received from the collection device.

Example 76 includes the panel of Example 73, wherein the panel further comprises a memory that stores connectivity information about the panel.

Example 77 includes the panel of Example 73, further comprising an energy storage device and a power staggering control, wherein the power staggering control regulates the use of power by the ports and connector plugs in the event of a power event experienced by the panel, such that different ports in the plurality of ports experience the power event at different times.

Example 78 includes the panel of Example 73, wherein the panel receives power from a power adapter.

Example 79 includes the panel of Example 78, wherein the panel is a master panel that receives the power from the power adapter and powers to one or more general panels.

Example 80 includes the panel of Example 78, wherein the panel indicates that it is present to the connection management system upon reception of the power from the power adapter.

Example 81 includes a panel, the panel comprising: a plurality of ports configured to receive a plurality of connector plugs, wherein one or more ports in the plurality of ports receives connectivity information from one or more connector plugs; a plurality of port processing units configured to execute instructions thereon, wherein each port processing unit in the plurality of port processing units is associated with a port in the plurality of ports; a panel processing unit coupled to the plurality of port processing units; a wireless communication interface, wherein the panel processing unit communicates connectivity information with a collection device through the wireless communication interface.

Example 82 includes the panel of Example 81, wherein a port in the plurality of ports comprises: a memory device configured to store information describing the port; contacts for connecting to a connector plug in the at least one connector plugs; a port LED, wherein the port LED is driven by a panel processing unit.

Example 83 includes the panel of Example 82, wherein the processing unit drives the port LED as instructed by commands received from the collection device.

Example 84 includes the panel of Example 81, wherein the panel further comprises a memory that stores connectivity information about the panel.

Example 85 includes the panel of Example 81, further comprising an energy storage device and a power staggering control, wherein the power staggering control regulates the use of power by the ports and connector plugs in the event of a power event experienced by the panel, such that different ports in the plurality of ports experience the power event at different times.

Example 86 includes the panel of Example 81, wherein the panel receives power from a power adapter.

Example 87 includes the panel of Example 86, wherein the panel is a master panel that receives the power from the power adapter and powers to one or more general panels.

Example 88 includes the panel of Example 86, wherein the panel indicates that it is present to the connection management system upon reception of the power from the power adapter.

Example 89 includes a system for providing panel virtualization, the system comprising: at least one panel, wherein a panel in the at least one panel comprises a panel wireless communication interface; a collection device comprising a master wireless communication interface, wherein connectivity information is communicated between the master wireless communication interface and the panel wireless communication interface; a connection management system, wherein the connection management system creates a virtual representation of the panel based on the connectivity information received by the collection device.

Example 90 includes the system of Example 89, wherein the panel wireless communication interface and the master wireless communication interface are at least one of: Bluetooth network interfaces; and IEEE Example 802. Example 15.4 network interfaces.

Example 91 includes the system of Example 89, wherein the collection device further comprises: a collection network interface; and a processing unit configured to translate the connectivity information from a first format for transmission through the master wireless communication interface to a second format for transmission through the collection network interface, wherein the connectivity information is communicated with the connection management system through the collection network interface.

Example 92 includes the system of Example 89, the panel further comprising a plurality of ports configured to receive a plurality of connector plugs.

Example 93 includes the system of Example 92, wherein the virtual representation of the panel represents the plurality of ports in an arrangement that is different from the physical arrangement of the plurality of ports at the panel.

Example 94 includes the system of Example 92, wherein a port in the plurality of ports comprises: a memory device configured to store information describing the port; and contacts for connecting to a connector plug.

Example 95 includes the system of Example 94, wherein the connector plug comprises: contacts for connecting to the port; a system on chip, the system on chip comprising a plug processing unit and a plug wireless communication interface, wherein the plug processing unit transmits plug connectivity information to the collection device through the plug wireless communication interface.

Example 96 includes the system of Example 95, wherein the virtual representation of the panel presents a plug virtual representation.

Example 97 includes the system of Example 96, wherein the plug virtual representation represents the connector plug in a manner different from the physical arrangement of the connector plug.

Example 98 includes the system of Example 89, wherein the virtual representation of the panel may present information from a plurality of panels.

Example 99 includes the system of Example 89, wherein the virtual representation of the panel may present information from a portion of the panel.

Example 100 includes a method for providing panel virtualization, the method comprising: identifying connectivity information at one of a panel or a connector plug for transmission to a collection device; transmitting the connectivity information to the collection device over a wireless communication interface; providing the connectivity information received over the wireless communication interface to a connection management system; and providing a virtual representation of the panel by the connection management system.

Example 101 includes the method of Example 100, wherein providing the connectivity information received over the wireless communication interface comprises: translating the connectivity information received over the wireless communication interface for transmission over a network interface; and communicating the connectivity information over the network interface to the connection management system.

Example 102 includes the method of Example 100, wherein the wireless communication interface is at least one of: a Bluetooth network interface; and an IEEE Example 802. Example 15.4 network interfaces.

Example 103 includes the method of Example 100, wherein the panel comprises a plurality of ports configured to receive a plurality of connector plugs.

Example 104 includes the method of Example 103, wherein the virtual representation of the panel represents the plurality of ports in an arrangement that is different from the physical arrangement of the plurality of ports at the panel.

Example 105 includes the method of Example 103, wherein a port in the plurality of ports comprises: a memory device configured to store information describing the port; and contacts for connecting to the connector plug.

Example 106 includes the method of Example 105, wherein the connector plug comprises: contacts for connecting to the port; a system on chip, the system on chip comprising a plug processing unit and a plug wireless communication interface, wherein the plug processing unit transmits plug connectivity information to the collection device through the plug wireless communication interface.

Example 107 includes the system of Example 100, wherein the virtual representation of the panel presents a plug virtual representation.

Example 108 includes the system of Example 107, wherein the plug virtual representation represents the connector plug in a manner different from the physical arrangement of the connector plug.

Example 109 includes the system of Example 100, wherein the virtual representation of the panel may present information from a plurality of panels.

Example 110 includes the system of Example 100, wherein the virtual representation of the panel may present information from a portion of the panel.

Example 111 includes a method for communicating connectivity information, the method comprising: identifying connectivity information at one of a panel or connector plug for use by a connection management system; transmitting the connectivity information to a collection device over one or more wireless communication interfaces; providing the connectivity information over to the connection management system.

Example 112 includes the method of Example 111, wherein the one or more wireless communication interfaces are at least one of: a Bluetooth network interface; and an IEEE Example 802. Example 15.4 network interface.

Example 113 includes the method of Example 111, wherein the panel comprises a plurality of ports for receiving one or more connector plugs.

Example 114 includes the method of Example 113, wherein a port in the plurality of ports comprises: a memory device configured to store information describing the port; contacts for connecting to a connector plug in the at least one connector plugs; a port LED, wherein the port LED is driven by a panel processing unit.

Example 115 includes the method of Example 111, wherein the panel comprises a panel microcontroller, the panel microcontroller comprising: a memory that stores connectivity information about the panel; and a system on chip comprising a panel processing unit and a panel wireless communication interface as one of the one or more wireless interfaces.

Example 116 includes the method of Example 115, wherein the panel processing unit is coupled to a plurality of port processing units, wherein each port processing unit in the plurality of port processing units is associated with a port in the plurality of ports.

Example 117 includes the method of Example 115, wherein the panel processing unit receives connectivity information from the connector plug, wherein the panel processing unit transmits the connectivity information to the collection device through the panel wireless communication interface.

Example 118 includes the method of Example 111, wherein the connector plug comprises: contacts for connecting to a port in the panel; and a system on chip, the system on chip comprising a plug processing unit and a plug wireless communication interface in the one or more wireless communication interfaces.

Example 119 includes the system of Example 118, wherein the panel processing unit checks that the port has a memory device, wherein the plug processing unit transmits the connectivity information to the collection device when the port has a memory device and the plug processing unit provides the connectivity information to the port when the port does not have a memory device.

Example 120 includes the system of Example 111, wherein the panel and the connector plug provide connectivity information in response to a request from the connection management system.

Example 121 includes the system of Example 111, wherein a transmission through the one or more wireless communication interfaces has a unique address that identifies one of the panel and the connector plug that produced the transmission.

Example 122 includes the system of Example 121, wherein the unique address is at least one of: an IEEE 802 MAC address; a randomly generated link layer address; and an address derived from identifiers for at least one of the panel, a port in the panel, and the connector plug.

Example 123 includes the system of Example 111, wherein the collection device is at least one of: a server; a mobile device; a part of the connection management system.

Example 124 includes the method of Example 111, further comprising: translating the connectivity information from a first format for transmission through the one or more wireless communication interfaces to a second format for transmission through an IP network, wherein the connectivity information is transmitted to the connection management system through the IP network.

Example 125 includes the method of Example 111, wherein the method further comprises receiving connectivity information for a plurality of panels at the collection device, wherein the panel is in the plurality of panels.

Example 126 includes the system of Example 125, wherein the collection device is a local master device for an area and the plurality of panels are located in the area.

Example 127 includes the system of Example 111, further comprising receiving additional connectivity information from a second collection device.

Example 128 includes a method for configuring a panel, the method comprising: providing power to the panel; transmitting an advertising event from the panel to a configuration device through a wireless communication interface; transmitting configuration information to the panel from the configuration device; and transmitting an advertising event from the panel to a master device, wherein the panel is configured according to the configuration information.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

What is claimed is:

1. Patching equipment, the patching equipment comprising:
    a plurality of ports configured to receive a plurality of connectors;
    a processing unit configured to execute instructions thereon;
    a wireless communication interface comprising a low energy wireless transmitter, wherein the processing unit communicates connectivity information to a collection device through the wireless communication interface via a personal area network;
    an energy storage device, wherein the energy storage device is configured to power the patching equipment after a power event; and
    a power staggering control, wherein the power staggering control regulates the use of power in connection with the ports and connectors in the event of the power event experienced by the patching equipment, such that the use of power in connection with different ports in the plurality of ports is impacted by the power event at different times.

2. The patching equipment of claim 1, wherein a port in the plurality of ports comprises:
    a memory device configured to store information describing the port;
    contacts for connecting to a connector in the plurality of connectors;
    a port LED, wherein the port LED is driven by a patching equipment processing unit.

3. The patching equipment of claim 2, wherein the processing unit drives the port LED as instructed by commands received from the collection device.

4. The patching equipment of claim 2, wherein the patching equipment further comprises a memory that stores connectivity information about the patching equipment.

5. The patching equipment of claim 1, wherein the processing unit is coupled to a plurality of port processing units, wherein each port processing unit in the plurality of port processing units is associated with a port in the plurality of ports.

6. The patching equipment of claim 1, wherein the processing unit receives connector connectivity information from at least one connector, wherein the processing unit transmits the connector connectivity information to the collection device through the patching equipment wireless communication interface.

7. The patching equipment of claim 1, wherein the plurality of ports each comprise one or more contacts, wherein the one or more contacts are configured to couple power and data between the respective port of the plurality of ports and a connector plug.

8. The patching equipment of claim 1, wherein the patching equipment receives power from a power adapter.

9. The patching equipment of claim 8, wherein the patching equipment is a master panel that receives the power from the power adapter and provides power to one or more general panels.

10. The patching equipment of claim 8, wherein the patching equipment indicates that it is present to a connection management system upon reception of the power from the power adapter.

11. A patching equipment, the patching equipment comprising:
    a processing unit configured to execute instructions thereon;
    a wireless communication interface comprising a low energy wireless transmitter, wherein the processing unit communicates connectivity information about the patching equipment to a collection device through the wireless communication interface via a personal area network;
    a plurality of ports, wherein the plurality of ports are configured to communicate connectivity information to the collection device through one or more connectors connected to one or more ports in the plurality of ports;
    an energy storage device, wherein the energy storage device is configured to power the patching equipment after a power event; and
    a power staggering control, wherein the power staggering control regulates the use of power in connection with the ports and connectors in the event of the power event experienced by the patching equipment, such that the use of power in connection with different ports in the plurality of ports is impacted by the power event at different times.

12. The patching equipment of claim 11, wherein a port in the plurality of ports comprises:
- a memory device configured to store information describing the port;
- contacts for connecting to a connector in the one or more connectors;
- a port LED, wherein the port LED is driven by the processing unit.

13. The patching equipment of claim 12, wherein the processing unit drives the port LED as instructed by commands received from the collection device.

14. The patching equipment of claim 11, wherein the patching equipment further comprises a memory that stores connectivity information about the patching equipment.

15. The patching equipment of claim 11, wherein the plurality of ports each comprise one or more contacts, wherein the one or more contacts are configured to couple power and data between the respective port of the plurality of ports and a connector plug.

16. The patching equipment of claim 11, wherein the patching equipment receives power from a power adapter.

17. The patching equipment of claim 16, wherein the patching equipment is a master panel that receives the power from the power adapter and powers to one or more general panels.

18. The patching equipment of claim 16, wherein the patching equipment indicates that it is present to a connection management system upon reception of the power from the power adapter.

19. A method for configuring patching equipment, the method comprising:
- providing power to the patching equipment;
- transmitting an advertising event from the patching equipment to a configuration device through a wireless communication interface comprising a low energy wireless transmitter via a personal area network;
- transmitting configuration information to the patching equipment from the configuration device;
- transmitting an advertising event from the patching equipment to a master device, wherein the patching equipment is configured according to the configuration information;
- powering the patching equipment after a power event; and
- regulating the use of power in connection with a plurality of ports and connectors of the patching equipment in the event of the power event experienced by the patching equipment, such that the use of power in connection with different ports in the plurality of ports is impacted by the power event at different times.

20. The method of claim 19, further comprising storing connectivity information about the patching equipment.

* * * * *